US012509493B2

(12) United States Patent
Fiedler et al.

(10) Patent No.: US 12,509,493 B2
(45) Date of Patent: Dec. 30, 2025

(54) FOLR1 SPECIFIC BINDING PROTEINS FOR CANCER DIAGNOSIS AND TREATMENT

(71) Applicant: Navigo Proteins GmbH, Halle/Saale (DE)

(72) Inventors: Erik Fiedler, Halle/Saale (DE); Ulrich Haupts, Halle/Saale (DE); Manja Gloser-Bräunig, Halle/Saale (DE); Eva Bosse-Doenecke, Halle/Saale (DE)

(73) Assignee: Navigo Proteins GmbH, Halle/Saale (DE)

( * ) Notice: Subject to any disclaimer, the term of this patent is extended or adjusted under 35 U.S.C. 154(b) by 134 days.

(21) Appl. No.: 17/416,183

(22) PCT Filed: Dec. 17, 2019

(86) PCT No.: PCT/EP2019/085596
§ 371 (c)(1),
(2) Date: Jun. 18, 2021

(87) PCT Pub. No.: WO2020/127224
PCT Pub. Date: Jun. 25, 2020

(65) Prior Publication Data
US 2022/0127312 A1    Apr. 28, 2022

(30) Foreign Application Priority Data

Dec. 18, 2018 (EP) .................................. 18213661
Mar. 4, 2019 (EP) .................................. 19160572

(51) Int. Cl.
*C07K 14/47* (2006.01)
*A61K 47/64* (2017.01)
*A61K 38/00* (2006.01)

(52) U.S. Cl.
CPC .......... *C07K 14/4702* (2013.01); *A61K 47/64* (2017.08); *A61K 38/00* (2013.01)

(58) Field of Classification Search
CPC .... C07K 14/4702; C07K 14/47; A61K 47/64; A61K 38/00; A61K 38/17; A61P 35/00
See application file for complete search history.

(56) References Cited

U.S. PATENT DOCUMENTS

| | | | |
|---|---|---|---|
| 4,873,192 A | 10/1989 | Kunkel | |
| 5,789,166 A | 8/1998 | Bauer et al. | |
| 5,958,684 A | 9/1999 | Van Leeuwen et al. | |
| 6,217,863 B1 | 4/2001 | Godavarti et al. | |
| 6,569,677 B1 | 5/2003 | Legrand et al. | |
| 6,620,587 B1 | 9/2003 | Taussig et al. | |
| 6,673,901 B2 | 1/2004 | Koide | |
| 6,799,121 B2 | 9/2004 | Chu et al. | |
| 7,250,297 B1 | 7/2007 | Beste et al. | |
| 7,273,924 B1 | 9/2007 | Neri et al. | |
| 7,393,918 B2 | 7/2008 | Golemi-Kotra et al. | |
| 7,601,803 B1 | 10/2009 | Fiedler et al. | |
| 7,838,629 B2 | 11/2010 | Fiedler et al. | |
| 7,851,599 B2 | 12/2010 | Menrad et al. | |
| 8,097,254 B2 | 1/2012 | Neri et al. | |
| 8,404,814 B2 | 3/2013 | Neri et al. | |
| 8,426,357 B2 | 4/2013 | Kraehmer et al. | |
| 8,455,625 B2 | 6/2013 | Neri et al. | |
| 8,592,144 B2 | 11/2013 | Fiedler et al. | |
| 8,592,179 B2 | 11/2013 | Schraeml et al. | |
| 8,623,373 B2 | 1/2014 | Zardi et al. | |
| 8,748,351 B2 | 6/2014 | Kunert et al. | |
| 8,790,895 B2 | 7/2014 | Fiedler et al. | |
| 8,791,238 B2 | 7/2014 | Fiedler et al. | |
| 8,921,304 B2 | 12/2014 | Steuernagel et al. | |
| 9,492,572 B2 | 11/2016 | Nerkamp et al. | |
| 10,858,405 B2 | 12/2020 | Bosse-Doenecke et al. | |
| 11,230,576 B2 | 1/2022 | Knick et al. | |
| 2003/0045681 A1 | 3/2003 | Neri et al. | |
| 2003/0073623 A1 | 4/2003 | Drmanac et al. | |
| 2004/0043386 A1 | 3/2004 | Pray et al. | |
| 2006/0058510 A1 | 3/2006 | Skerra et al. | |
| 2006/0099686 A1 | 5/2006 | Fiedler et al. | |
| 2007/0015248 A1 | 1/2007 | Anton et al. | |
| 2007/0111287 A1 | 5/2007 | Fiedler et al. | |
| 2007/0189963 A1 | 8/2007 | Neri et al. | |
| 2007/0248536 A1 | 10/2007 | Fiedler et al. | |
| 2007/0286843 A1 | 12/2007 | Pfizenmaier et al. | |
| 2008/0171851 A1 | 7/2008 | Fiedler et al. | |
| 2010/0119446 A1 | 5/2010 | Grabulovski et al. | |
| 2010/0130720 A1 | 5/2010 | Schraeml et al. | |

(Continued)

FOREIGN PATENT DOCUMENTS

| | | |
|---|---|---|
| AU | 2013318928 | 4/2015 |
| CN | 102753569 A | 10/2012 |
| CN | 103539851 A | 1/2014 |
| CN | 107793471 | 3/2018 |
| CN | 107849147 A | 3/2018 |
| EP | 1 591 527 A1 | 11/2005 |
| EP | 2 532 672 A2 | 12/2012 |
| EP | 2727942 A1 | 5/2014 |

(Continued)

OTHER PUBLICATIONS

Bowie et al (Science, 1990, 247:1306-1310) (Year: 1990).*
Burgess et al (J. Cell Biol. 111:2129-2138, 1990) (Year: 1990).*
Lazar et al (Mol. Cell. Biol., 8:1247-1252, 1988) (Year: 1988).*
Guo et al (PNAS, 2004, 101(25), 9205-9210) (Year: 2004).*
Yampolsky et al (Genetics, 2005, 170, 1459-1472) (Year: 2005).*
Chari et al. (2014) Antibody-drug conjugates: an emerging concept in cancer therapy, Angew. Chem. Int. Ed. 2014, vol. 53, pp. 3796-3872.
International Preliminary Report on Patentability corresponding to International Patent Application No. PCT/EP2020/052438 dated Jul. 27, 2021.

(Continued)

*Primary Examiner* — Sudhakar Katakam
(74) *Attorney, Agent, or Firm* — Jenkins, Taylor & Hunt, P.A.

(57) ABSTRACT

The present invention relates to new binding proteins that are specific for folate receptor alpha (FOLR1). The invention further refers to FOLR1 binding proteins that further comprises a diagnostically or therapeutically active component. Further aspects of the invention cover the use of these FOLR1 binding proteins in medicine, for example, in diagnosis and therapy of FOLR1 related cancer.

14 Claims, 2 Drawing Sheets
Specification includes a Sequence Listing.

(56) References Cited

U.S. PATENT DOCUMENTS

| | | |
|---|---|---|
| 2011/0162095 A1 | 6/2011 | Hill et al. |
| 2012/0244596 A1 | 9/2012 | Skerra et al. |
| 2012/0301393 A1 | 11/2012 | Steuernagel et al. |
| 2013/0011334 A1 | 1/2013 | Steuernagel et al. |
| 2013/0097737 A1 | 4/2013 | Kovalic et al. |
| 2013/0157878 A1 | 6/2013 | Kunert et al. |
| 2014/0135476 A1 | 5/2014 | Hall et al. |
| 2014/0219959 A1 | 8/2014 | Nerkamp et al. |
| 2015/0183846 A1 | 7/2015 | Lange et al. |
| 2018/0030098 A1 | 2/2018 | Bosse-Doenecke et al. |
| 2018/0030140 A1 | 2/2018 | Bosse-Doenecke et al. |
| 2018/0194819 A1 | 7/2018 | Fiedler et al. |
| 2018/0273636 A1 | 9/2018 | Settele et al. |
| 2018/0305463 A1 | 10/2018 | Haupts |
| 2019/0117791 A1 | 4/2019 | Haupts et al. |
| 2019/0177376 A1 | 6/2019 | Knick et al. |
| 2021/0179678 A1 | 6/2021 | Fiedler et al. |
| 2022/0112236 A1 | 4/2022 | Fiedler et al. |

FOREIGN PATENT DOCUMENTS

| | | |
|---|---|---|
| EP | 2738180 | 6/2014 |
| EP | 2829552 A1 | 1/2015 |
| RU | 2134696 C1 | 8/1999 |
| WO | WO 2005/044845 A2 | 5/2005 |
| WO | WO 2007/054120 A1 | 5/2007 |
| WO | WO 2012/171541 A1 | 12/2012 |
| WO | WO 2013/186329 A1 | 12/2013 |
| WO | WO2014/094799 | 6/2014 |
| WO | WO2016/124670 A1 | 8/2016 |
| WO | WO2016/124702 A1 | 8/2016 |
| WO | WO2017/013129 | 1/2017 |
| WO | WO2017/013136 | 1/2017 |
| WO | WO2017009421 | 1/2017 |
| WO | WO 2018/029157 A1 | 2/2018 |
| WO | WO 2019/030156 A1 | 2/2019 |
| WO | WO 2019/152318 A1 | 8/2019 |
| WO | WO 2020/157281 A1 | 8/2020 |

OTHER PUBLICATIONS

International Search Report corresponding to International Patent Application No. PCT/EP2020/052438 dated Mar. 19, 2020.
Jiang Jianwei et al., Research progress on folate receptor-mediated drug targeted delivery system, Sect. Clin. Biochem. & Lab Med. Foreign Med. Sci., 2004, vol. 25, No. 4, pp. 345-351.
Notice of Allowance corresponding to U.S. Appl. No. 16/324,651 dated Oct. 26, 2021.
Notice of Allowance corresponding to U.S. Appl. No. 16/761,677 dated Apr. 6, 2022.
Notification to Make Divisional Application corresponding to Chinese Patent Application No. 201980079629.0 dated Nov. 24, 2023.
Office Action corresponding to U.S. Appl. No. 16/098,600 dated Apr. 1, 2022.
Office Action (Restriction Requirement) corresponding to U.S. Appl. No. 16/324,651 dated Feb. 4, 2021.
Office Action corresponding to U.S. Appl. No. 16/324,651 dated Jun. 4, 2021.
Office Action (Restriction Requirement) corresponding to U.S. Appl. No. 16/761,677 dated Nov. 12, 2021.
Office Action corresponding to Chinese Patent Application No. 201980079629.0 dated Mar. 15, 2024.
Written Opinion corresponding to International Application No. PCT/EP2020/052438 dated Aug. 6, 2020.
International Preliminary Report on Patentability (Chapter I of the Patent Cooperation Treaty) corresponding to International Patent Application No. PCT/EP2007/062375 dated May 19, 2009.
International Preliminary Report on Patentability (Chapter I of the Patent Cooperation Treaty) corresponding to International Patent Application No. PCT/EP2010/069665 dated Jun. 19, 2012.
International Preliminary Report on Patentability (Chapter I of the Patent Cooperation Treaty) corresponding to International Patent Application No. PCT/EP2016/052345 dated Aug. 8, 2017.
International Preliminary Report on Patentability corresponding to International Patent Application No. PCT/EP2004/005730 dated May 13, 2005. (with Translation).
International Preliminary Report on Patentability corresponding to International Patent Application No. PCT/EP2016/067216 dated Jan. 23, 2018.
International Search Report and Written Opinion corresponding to International Application No. PCT/EP2016/066774 dated Sep. 14, 2016.
International Search Report and Written Opinion corresponding to International Application No. PCT/EP2016/067216 dated Oct. 12, 2016.
International Search Report and Written Opinion corresponding to International Patent Application No. PCT/EP2016/052408 dated May 2, 2016.
International Search Report corresponding to International Application No. PCT/EP2016/067207 dated Sep. 29, 2016.
International Search Report corresponding to International Patent Application No. PCT/EP2000/006698 dated Feb. 2, 2001.
International Search Report corresponding to International Patent Application No. PCT/EP2004/005730 dated Oct. 5, 2004.
International Search Report corresponding to International Patent Application No. PCT/EP2005/010932 dated Apr. 11, 2006.
International Search Report corresponding to International Patent Application No. PCT/EP2007/062375 dated Apr. 25, 2008.
International Search Report corresponding to International Patent Application No. PCT/EP2010/069665 dated Apr. 13, 2011.
International Search Report corresponding to International Patent PCT/EP2010/069674 dated Jun. 17, 2011.
International Search Report corresponding to International Patent PCT/EP2011/002962 dated Mar. 19, 2012.
International Search Report corresponding to International Patent PCT/EP2012/061455 dated Oct. 25, 2012.
International Search Report corresponding to International Patent Application No. PCT/EP2012/061459 dated Sep. 24, 2012.
International Search Report corresponding to International Patent Application No. PCT/EP2013/062310 dated Aug. 2, 2013.
International Search Report corresponding tc International Patent PCTIEP2019/085596 dated Feb. 6, 2020.
Jackson (2006) Ubiquitin: a small protein folding paradigm. Org Biomol Chem 4(10):1845-1853.
Khorasanizadeh et al. (1993) Folding and stability of a tryptophan-containing mutant of ubiquitin. Biochemistry 32(27):7054-7063.
Kiel & Serrano (2006) The Ubiquitin Domain Superfold: Structure-based Sequence Alignments and Characterization of Binding Epitopes. Journal of Molecular Biology 355(4):821-844.
Knappik et al. (2000) Fully Synthetic Human Combinatorial Antibody Libraries (HuCAL) Based on Modular Consensus Frameworks and CDRs Randomized with Trinucleotides. Journal of Molecular Biology 296:57-86.
Koide et al. (1998)The Fibronectin Type III Domain as a Scaffold for Novel Binding Proteins. Journal of Molecular Biology 284:1141-1151.
Kolchanov & Shindyalov (1988) Single amino acid substitutions producing instability of globular proteins. Calculation of their frequencies in the entire mutational spectra of the alpha- and beta-subunits of human hemoglobin. Journal of Molecular Evolution 27:154-162.
Ku & Schultz (1995) Alternate protein frameworks for molecular recognition. PNAS 92:6552-6556.
Larsen & Wang. (2002) The Ubiquitin Superfamily: Members, Features, and Phylogenies. Journal of Proteome Research 1:411-419.
Laub et al. (1995) Localized solution structure refinement of an F45W variant of ubiquitin using stochastic boundary molecular dynamics and NMR distance restraints. Protein Science 4:973-982.
Lazar & Wang (1997) H.De novo design of the hydrophobic core of ubiquitin. Protein Science 6:1167-1178.

(56) References Cited

OTHER PUBLICATIONS

Lipovsek & Plückthun (2004) In-vitro protein evolution by ribosome display and mRNA display. Journal of Immunological Methods 290:51-67.
Lo et al. (2009) Structural Basis for Recognition of Diubiquitins by NEMO. Molecular Cell 33:602- 615.
Loladze et al. (2005) Both helical propensity and side-chain hydrophobicity at a partially exposed site in alpha-helix contribute to the thermodynamic stability of ubiquitin. Proteins 58(1):1-6.
Lorey et al. (2014) Novel ubiquitin-derived high affinity binding proteins with tumor targeting properties. Journal of Biological Chemistry. 289(12):8493-8507.
McConnell & Hoess (1995) Tendamistat as a Scaffold for Conformationally Constrained Phage Peptide Libraries. The Journal of Molecular Biology 250:460-470.
Nord et al. (1997) Binding proteins selected from combinatorial libraries of an (-helical bacterial receptor domain. Nature Biotechnology 15:772-777.
Notice of Allowance corresponding to U.S. Appl. No. 10/030,605 dated Apr. 14, 2009.
Notice of Allowance corresponding to U.S. Appl. No. 11/283,332 dated Jun. 6, 2014.
Notice of Allowance corresponding to U.S. Appl. No. 11/656,646 dated Aug. 27, 2013.
Notice of Allowance corresponding to U.S. Appl. No. 11/732,632 dated Aug. 23, 2010.
Notice of Allowance corresponding to U.S. Appl. No. 12/072,959 dated Jun. 3, 2014.
Notice of Allowance corresponding to U.S. Appl. No. 12/514,550 dated Sep. 10, 2013.
Notice of Allowance corresponding to U.S. Appl. No. 13/142,195 dated Aug. 4, 2014.
Notice of Allowance corresponding to U.S. Appl. No. 13/144,809 dated Mar. 3, 2014.
Notice of Allowance corresponding to U.S. Appl. No. 14/126,358 dated Sep. 9, 2016.
Notice of Allowance corresponding to U.S. Appl. No. 15/548,976 dated Jul. 22, 2020.
Notice of Allowance corresponding to U.S. Appl. No. 15/744,054 dated Jan. 9, 2020.
Notice of Allowance corresponding to U.S. Appl. No. 15/744,147 dated Aug. 17, 2020.
Nygren & Uhlen (1997) Scaffolds for engineering novel binding sites in proteins. Current Opinion in Structural Biology 7:463-469.
Office Action corresponding to Australian Patent Application No. 2012268970 dated Aug. 27, 2015.
Office Action corresponding to Canadian Patent Application No. 2,778,871 dated Jan. 30, 2014.
Office Action corresponding to Canadian Patent Application No. 2,837,804 dated May 1, 2015.
Office Action corresponding to Chinese Patent Application No. 201080056911.6 dated Jul. 31, 2013. Translation.
Office Action corresponding to European Patent Application No. 00 944 034.8-2401 dated Oct. 7, 2004. (with Translation).
Office Action corresponding to Japanese Patent Application No. 2012-504036 dated Aug. 26, 2013.
Office Action corresponding to Japanese Patent Application No. 2012-542583 dated Apr. 22, 2014.
Office Action corresponding to Korean Patent Application No. 10-2011-7018847 dated Jan. 30, 2013. Translation.
Office Action corresponding to Russian Patent Application No. 2012114662/10(022146) dated Dec. 18, 2013.
Office Action corresponding to Russian Patent Application No. 2012114662/10(022146) dated Sep. 8, 2014. (with Translation).
Office Action corresponding to Russian Patent Application No. 2012115491 dated Dec. 24, 2013.
Office Action corresponding to U.S. Appl. No. 10/030,605 dated Apr. 12, 2006.
Office Action corresponding to U.S. Appl. No. 10/030,605 dated Aug. 10, 2005.
Office Action corresponding to U.S. Appl. No. 10/030,605 dated Feb. 15, 2005.
Office Action corresponding to U.S. Appl. No. 10/030,605 dated Feb. 28, 2007.
Office Action corresponding to U.S. Appl. No. 10/030,605 dated Jul. 1, 2008.
Office Action corresponding to U.S. Appl. No. 10/030,605 dated Nov. 16, 2007.
Office Action corresponding to U.S. Appl. No. 10/030,605 dated Sep. 21, 2004.
Office Action corresponding to U.S. Appl. No. 11/283,332 dated Jan. 9, 2008.
Office Action corresponding to U.S. Appl. No. 11/283,332 dated Mar. 3, 2010.
Office Action corresponding to U.S. Appl. No. 11/283,332 dated May 30, 2008.
Office Action corresponding to U.S. Appl. No. 11/283,332 dated Nov. 28, 2008.
Office Action corresponding to U.S. Appl. No. 11/283,332 dated Sep. 3, 2013.
Office Action corresponding to U.S. Appl. No. 11/283,332 dated Sep. 4, 2009.
Office Action corresponding to U.S. Appl. No. 11/656,646 dated May 25, 2010.
Office Action corresponding to U.S. Appl. No. 11/656,646 dated Nov. 13, 2009.
Office Action corresponding to U.S. Appl. No. 11/656,646 dated Sep. 1, 2009.
Office Action corresponding to U.S. Appl. No. 11/732,632 dated Aug. 21, 2009.
Office Action corresponding to U.S. Appl. No. 11/732,632 dated Jun. 3, 2009.
Office Action corresponding to U.S. Appl. No. 11/732,632 dated Mar. 19, 2010.
Office Action corresponding to U.S. Appl. No. 12/072,959 dated Aug. 30, 2013.
Office Action corresponding to U.S. Appl. No. 12/072,959 dated Jan. 27, 2009.
Office Action corresponding to U.S. Appl. No. 12/072,959 dated Jan. 5, 2010.
Office Action corresponding to U.S. Appl. No. 12/072,959 dated Jul. 24, 2008.
Office Action corresponding to U.S. Appl. No. 12/514,550 dated Aug. 3, 2011.
Office Action corresponding to U.S. Appl. No. 12/514,550 dated Mar. 12, 2012.
Office Action corresponding to U.S. Appl. No. 12/514,550 dated Sep. 15, 2011.
Office Action corresponding to U.S. Appl. No. 13/142,195 dated Feb. 11, 2013.
Office Action corresponding to U.S. Appl. No. 13/142,195 dated Feb. 4, 2014.
Office Action corresponding to U.S. Appl. No. 13/142,195 dated May 29, 2013.
Office Action corresponding to U.S. Appl. No. 13/144,809 dated Oct. 18, 2013.
Office Action corresponding to U.S. Appl. No. 13/516,002 dated Apr. 6, 2015.
Office Action corresponding to U.S. Appl. No. 13/516,002 dated Jan. 26, 2015.
Office Action corresponding to U.S. Appl. No. 14/126,341 dated May 1, 2015.
Office Action corresponding to U.S. Appl. No. 14/126,341 dated Sep. 29, 2015.
Office Action corresponding to U.S. Appl. No. 14/126,358 dated Apr. 6, 2016.
Office Action corresponding to U.S. Appl. No. 14/407,213 dated May 25, 2016.
Office Action corresponding to U.S. Appl. No. 15/549,022 dated Nov. 8, 2018.
Office Action corresponding to U.S. Appl. No. 15/744,054 dated Jul. 30, 2019.

(56) References Cited

OTHER PUBLICATIONS

Office Action corresponding to U.S. Appl. No. 15/744,054 dated Mar. 14, 2019.
Office Action corresponding to U.S. Appl. No. 15/744,147 dated Apr. 1, 2020.
Office Action corresponding to U.S. Appl. No. 16/376,847 dated Feb. 24, 2021.
Office Action corresponding to U.S. Appl. No. 15/548,976 dated Mar. 17, 2020.
Search Report corresponding to Chinese Patent Application No. 201080056911.6 dated Jun. 14, 2013. Translation.
Skerra (2000) Engineered protein scaffolds for molecular recognition. Journal of Molecular Recognition 13(4):167-187.
Skerra et al. (2007) Alternative non-antibody scaffolds for molecular recognition. Current Opinion in Biotechnology 18(4):295-304.
Smith et al. (1998) Small Binding Proteins Selected from a Conbinatorial Repertoire of Knottins Displayed on Phage. Journal of Molecular Biology 277(2):317-332.
Weidle et al. (2013) The Emerging Role of New Protein Scaffold-based Agents for Treament of Cancer. Caner Genomics & Proteomics 10(4):155-168.
Written Opinion corresponding to International Application No. PCT/EP2019/085596 dated Jun. 25, 2020.
Abedi et al. (1998) Green fluorescent protein as a scaffold for intracellular presentation of peptides. Nucleic Acids Research 26(2):623-630.
Advisory Action corresponding to U.S. Appl. No. 10/030,605 dated Oct. 13, 2006.
Advisory Action corresponding to U.S. Appl. No. 11/732,632 dated Jun. 30, 2010.
Advisory Action corresponding to U.S. Appl. No. 12/072,959 dated May 18, 2010.
Baker et al. (1994) Protein Expression Using Cotranslational Fusion and Cleavage of Ubiquitin. The Journal of Biological Chemistry 269(41):25381-25386.
Beal et al. (1996) Surface hydrophobic residues of multiubiquitin chains essential for proteolytic targeting. PNAS 93:861-866.
Beste et al. (1999) Small antibody-like proteins with prescribed ligand specificities derived from the lipocalin fold. PNAS 96:1898-1903.
Birchler et al. (1999) Selective targeting and photocoagulation of ocular angiogenesis mediated by a phage-derived human antibody fragment. Nature Biotechnology 17:984-988.
Bird et al. (1988) Single-Chain Antigen-Binding Proteins. Science. 242:423-426.
Bofill et al. (2005) Engineering Stabilising beta-Sheet Interactions into a Conformationally Flexible Region of the Folding Transition State of Ubiquitin. Journal of Molecular Biology 353(2):373-384.
Bolton et al. (2001) Structure and Properties of a Dimeric N-terminal Fragment of Human Ubiquitin. Journal of Molecular Biology 314(4):773-787.
Buchberger et al. (2001) The UBX Domain: A Widespread Ubiquitin-Like Module. Journal of Molecular Biology 307(1):17-24.
Burch & Haas (1994) Site-directed mutagenesis of ubiquitin. Differential roles for arginine in the interaction with ubiquitin-activating enzyme. Biochemistry 33(23):7300-7308.
Cheung et al., "Targeting folate receptor alpha for cancer treatment," Oncotarget, vol. 7, No. 32, (Aug. 9, 2016).
Corrected Notice of Allowability corresponding to U.S. Appl. No. 11/656,646 dated Sep. 26, 2013.
Dikic et al. (2009) Ubiquitin-binding domains—from structures to functions. Nature Reviews 10:659-671.
Ecker et al. (1987) Gene Synthesis, Expression, Structures, and Functional Activities of Site-specific Mutants of Ubiquitin. The Journal of Biological Chemistry 262(29):14213-14221.
European Search Report corresponding to European Patent Application No. 06 118 519.5-2401 dated Apr. 2, 2007.
European Search Report corresponding to European Patent Application No. 09 176 574.3-2401 dated Jan. 18, 2010. (with Translation).
European Search Report corresponding to European Patent Application No. 10 181 802.9-2401 dated Feb. 10, 2011. (with Translation).
Extended European Search Report corresponding to European Patent Application No. 18/213,661.4-1111 dated May 31, 2019.
Hanes et al. (2000) Picomolar affinity antibodies from a fully synthetic naive library selected and evolved by ribosome display. Nature Biotechnology 18:1287-1292.

* cited by examiner

FIG. 1. Amino acid sequences of FOLR1 binding proteins (in grey: differences to SEQ ID NO: 46)

FIG. 2. Affilin-199490 binds to FOLR1 (FOLR-alpha) with high affinity
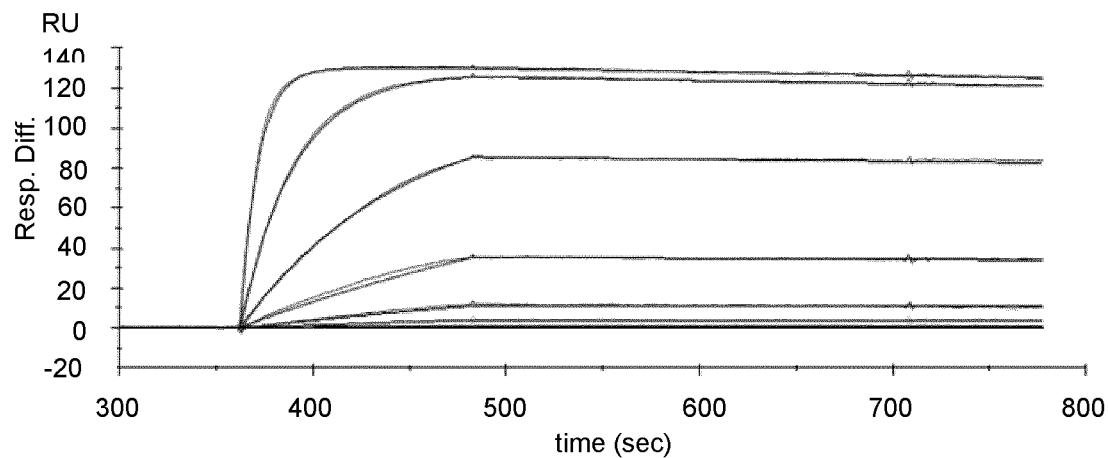
FIG. 3. No binding of Affilin-199490 to FOLR2 (FOLR-beta)
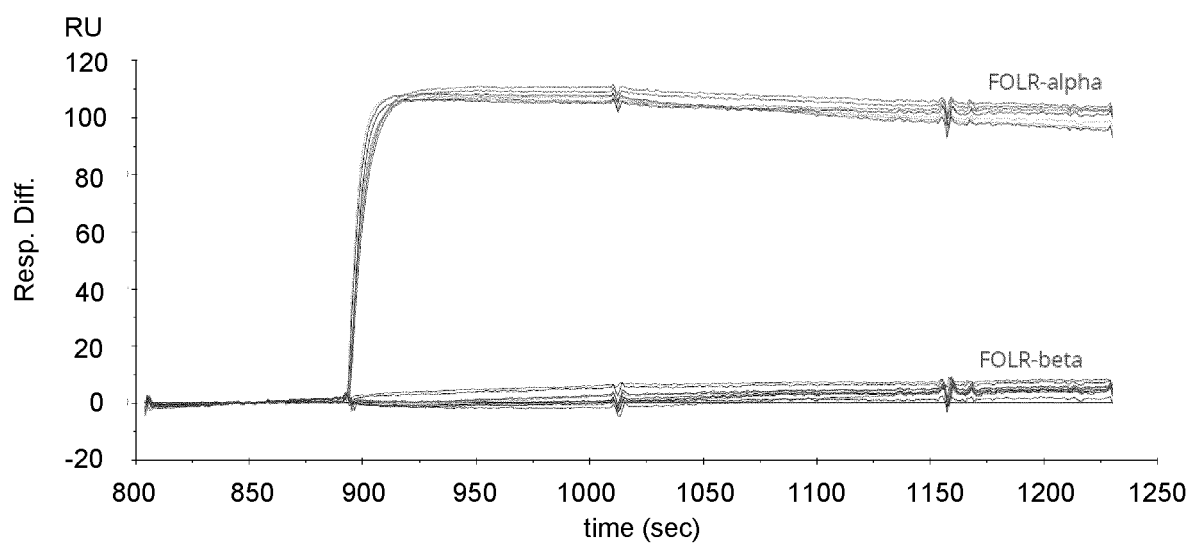

SEQUENCE LISTING

<160> NUMBER OF SEQ ID NOS: 76

<210> SEQ ID NO 1
<211> LENGTH: 76
<212> TYPE: PRT
<213> ORGANISM: Artificial Sequence
<220> FEATURE:
<223> OTHER INFORMATION: Artificially synthesized Affilin 197556a

<400> SEQUENCE: 1

Met Gln Ile Phe Val Lys Thr Leu Glu Glu Lys Tyr Ile Ala Leu Glu
1               5                   10                  15

Val Glu Pro Cys Asp Thr Ile Glu Asn Val Lys Ala Lys Val Gln Asp
            20                  25                  30

Lys Glu Gly Ile Pro Pro Asp Gln Gln Glu Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala
65                  70                  75

<210> SEQ ID NO 2
<211> LENGTH: 76
<212> TYPE: PRT
<213> ORGANISM: Artificial Sequence
<220> FEATURE:
<223> OTHER INFORMATION: Artificially synthesized Affilin 197556b

<400> SEQUENCE: 2

```
Met Gln Ile Phe Val Lys Thr Leu Glu Glu Lys Tyr Ile Ala Leu Glu
1               5                   10                  15

Val Glu Pro Ser Asp Thr Ile Glu Asn Val Lys Ala Lys Val Gln Asp
            20                  25                  30

Lys Glu Gly Ile Pro Pro Asp Gln Glu Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala
65                  70                  75
```

<210> SEQ ID NO 3
<211> LENGTH: 76
<212> TYPE: PRT
<213> ORGANISM: Artificial Sequence
<220> FEATURE:
<223> OTHER INFORMATION: Artificially synthesized Affilin 197251

<400> SEQUENCE: 3

```
Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Val Gln Gly
            20                  25                  30

Lys Glu Gly Ile Pro Pro Asp Gln Glu Leu Leu Trp Tyr Gly Glu
        35                  40                  45

Gln Leu Glu Gly Gly Arg Thr Leu Ser Asp Tyr Asn Ile Leu Gly Gly
    50                  55                  60

Ala Val Leu Lys Leu Gln Leu Arg Leu Arg Ala Ala
65                  70                  75
```

<210> SEQ ID NO 4
<211> LENGTH: 76
<212> TYPE: PRT
<213> ORGANISM: Artificial Sequence
<220> FEATURE:
<223> OTHER INFORMATION: Artificially synthesized Affilin 196962

<400> SEQUENCE: 4

```
Met Gln Ile Phe Val Lys Thr Leu Glu Glu Lys Tyr Thr Thr Leu Glu
1               5                   10                  15

Val Glu Pro Ser Asp Thr Ile Glu Asn Val Lys Ala Arg Ile Gln Asp
            20                  25                  30

Lys Glu Gly Ile Pro Pro Asp Gln Lys Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala
65                  70                  75
```

<210> SEQ ID NO 5
<211> LENGTH: 76
<212> TYPE: PRT
<213> ORGANISM: Artificial Sequence
<220> FEATURE:
<223> OTHER INFORMATION: Artificially synthesized Affilin 197525

<400> SEQUENCE: 5

```
Met Gln Ile Phe Val Lys Thr Leu Glu Glu Lys Tyr Ile Thr Leu Glu
1               5                   10                  15
```

```
Val Glu Pro Ser Asp Thr Ile Glu Asn Val Lys Ala Arg Val Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala
65                  70                  75
```

<210> SEQ ID NO 6
<211> LENGTH: 76
<212> TYPE: PRT
<213> ORGANISM: Artificial Sequence
<220> FEATURE:
<223> OTHER INFORMATION: Artificially synthesized Affilin 187731

<400> SEQUENCE: 6

```
Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala
65                  70                  75
```

<210> SEQ ID NO 7
<211> LENGTH: 76
<212> TYPE: PRT
<213> ORGANISM: Artificial Sequence
<220> FEATURE:
<223> OTHER INFORMATION: Artificially synthesized Affilin 197132

<400> SEQUENCE: 7

```
Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp His Asn Ile Leu Gly Gly
    50                  55                  60

Ala Val Leu Lys Leu Gln Leu Arg Leu Arg Ala Ala
65                  70                  75
```

<210> SEQ ID NO 8
<211> LENGTH: 76
<212> TYPE: PRT
<213> ORGANISM: Artificial Sequence
<220> FEATURE:
<223> OTHER INFORMATION: Artificially synthesized Affilin 197340

<400> SEQUENCE: 8

```
Met Gln Ile Phe Val Lys Thr Leu Glu Glu Arg Tyr Ile Thr Leu Glu
1               5                   10                  15

Val Glu Pro Ser Asp Thr Ile Glu Asn Val Lys Ala Lys Ile Gln Asp
            20                  25                  30
```

```
Lys Glu Gly Ile Pro Pro Asp Gln Gln Lys Leu Leu Trp Tyr Gly Glu
            35                  40                  45

Arg Leu Glu Asp Gly Arg Thr Leu Ser Asn Tyr Asn Ile Leu Gly Gly
 50                  55                  60

Ala Val Leu Lys Leu Gln Leu Arg Leu Arg Ala Ala
 65                  70                  75

<210> SEQ ID NO 9
<211> LENGTH: 76
<212> TYPE: PRT
<213> ORGANISM: Artificial Sequence
<220> FEATURE:
<223> OTHER INFORMATION: Artificially synthesized Affilin 196920

<400> SEQUENCE: 9

Met Gln Ile Phe Val Lys Thr Leu Glu Glu Arg Tyr Ile Thr Leu Glu
 1               5                  10                  15

Val Glu Pro Ser Asp Thr Ile Glu Asn Val Lys Ala Lys Ile Gln Gly
            20                  25                  30

Lys Glu Gly Ile Pro Pro Asp Gln Gln Lys Leu Leu Trp Tyr Gly Glu
            35                  40                  45

Gln Leu Lys Asp Gly Arg Thr Leu Ser Asp Tyr Ser Ile Leu Gly Gly
 50                  55                  60

Ala Val Leu Lys Leu Gln Leu Arg Leu Arg Ala Ala
 65                  70                  75

<210> SEQ ID NO 10
<211> LENGTH: 76
<212> TYPE: PRT
<213> ORGANISM: Artificial Sequence
<220> FEATURE:
<223> OTHER INFORMATION: Artificially synthesized Affilin 197103

<400> SEQUENCE: 10

Met Gln Ile Phe Val Lys Thr Leu Glu Glu Lys Tyr Ile Thr Leu Glu
 1               5                  10                  15

Val Glu Pro Ser Asp Thr Thr Glu Asp Val Lys Ala Lys Ile Gln Asp
            20                  25                  30

Lys Glu Gly Ile Pro Pro Asp Gln Gln Lys Leu Leu Trp Tyr Gly Glu
            35                  40                  45

Gln Leu Glu Asp Gly Arg Thr Leu Ser Asp Tyr Asn Ile Leu Gly Gly
 50                  55                  60

Ala Val Leu Lys Leu Gln Pro Arg Leu Arg Ala Ala
 65                  70                  75

<210> SEQ ID NO 11
<211> LENGTH: 76
<212> TYPE: PRT
<213> ORGANISM: Artificial Sequence
<220> FEATURE:
<223> OTHER INFORMATION: Artificially synthesized Affilin 197032

<400> SEQUENCE: 11

Met Gln Ile Phe Val Lys Thr Leu Glu Glu Lys Tyr Ile Thr Leu Glu
 1               5                  10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Arg Tyr Gly Lys
            35                  40                  45
```

Gln Leu Glu Asp Gly Arg Thr Leu Ser Asp Tyr Asn Ile Leu Gly Gly
        50                  55                  60

Ala Val Leu Lys Leu Gln Pro Arg Leu Arg Ala Ala
65                  70                  75

<210> SEQ ID NO 12
<211> LENGTH: 76
<212> TYPE: PRT
<213> ORGANISM: Artificial Sequence
<220> FEATURE:
<223> OTHER INFORMATION: Artificially synthesized Affilin 196964

<400> SEQUENCE: 12

Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Leu Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Thr Ile Leu Gly Gly
        50                  55                  60

Ala Val Leu Lys Leu Gln Leu Arg Leu Arg Ala Ala
65                  70                  75

<210> SEQ ID NO 13
<211> LENGTH: 76
<212> TYPE: PRT
<213> ORGANISM: Artificial Sequence
<220> FEATURE:
<223> OTHER INFORMATION: Artificially synthesized Affilin 197312

<400> SEQUENCE: 13

Met Gln Ile Phe Val Lys Thr Leu Glu Glu Lys Tyr Ile Pro Leu Glu
1               5                   10                  15

Val Glu Pro Ser Asp Thr Ile Glu Asn Val Lys Ala Thr Ile Gln Asp
            20                  25                  30

Lys Glu Gly Ile Pro Pro Asp Gln Gln Lys Leu Leu Trp Tyr Gly Lys
        35                  40                  45

Gln Leu Asp Asp Gly Arg Thr Leu Ser Asp Tyr Asn Ile Leu Gly Gly
        50                  55                  60

Ala Val Leu Lys Leu Gln Leu Arg Leu Arg Ala Ala
65                  70                  75

<210> SEQ ID NO 14
<211> LENGTH: 76
<212> TYPE: PRT
<213> ORGANISM: Artificial Sequence
<220> FEATURE:
<223> OTHER INFORMATION: Artificially synthesized Affilin 196868

<400> SEQUENCE: 14

Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Thr Ile Leu Gly Gly
        50                  55                  60

Ala Val Leu Lys Leu Gln Leu Arg Leu Arg Ala Ala
 65                  70                  75

<210> SEQ ID NO 15
<211> LENGTH: 76
<212> TYPE: PRT
<213> ORGANISM: Artificial Sequence
<220> FEATURE:
<223> OTHER INFORMATION: Artificially synthesized Affilin 197044

<400> SEQUENCE: 15

Met Gln Ile Phe Val Lys Thr Leu Glu Glu Lys Tyr Ile Thr Leu Glu
1               5                   10                  15

Val Glu Pro Gly Asp Thr Ile Glu Asn Val Lys Ala Glu Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Gln Pro Arg Leu Arg Ala Ala
 65                  70                  75

<210> SEQ ID NO 16
<211> LENGTH: 76
<212> TYPE: PRT
<213> ORGANISM: Artificial Sequence
<220> FEATURE:
<223> OTHER INFORMATION: Artificially synthesized Affilin 197230

<400> SEQUENCE: 16

Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Glu Ile Gln Gly
            20                  25                  30

Arg Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala
 65                  70                  75

<210> SEQ ID NO 17
<211> LENGTH: 76
<212> TYPE: PRT
<213> ORGANISM: Artificial Sequence
<220> FEATURE:
<223> OTHER INFORMATION: Artificially synthesized Affilin 197383

<400> SEQUENCE: 17

Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asn
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Asp
    50                  55                  60

Ala Val Leu Lys Leu Gln Leu Arg Leu Arg Ala Ala
 65                  70                  75

```
<210> SEQ ID NO 18
<211> LENGTH: 76
<212> TYPE: PRT
<213> ORGANISM: Artificial Sequence
<220> FEATURE:
<223> OTHER INFORMATION: Artificially synthesized Affilin 196934

<400> SEQUENCE: 18

Met Gln Ile Phe Val Lys Thr Leu Glu Glu Arg Tyr Ile Thr Leu Glu
1               5                   10                  15

Val Glu Pro Ser Asp Thr Ile Gly Asn Val Lys Ala Lys Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Asp
    50                  55                  60

Ala Val Leu Lys Leu Gln Leu Arg Leu Arg Ala Ala
65                  70                  75

<210> SEQ ID NO 19
<211> LENGTH: 76
<212> TYPE: PRT
<213> ORGANISM: Artificial Sequence
<220> FEATURE:
<223> OTHER INFORMATION: Artificially synthesized Affilin 197126

<400> SEQUENCE: 19

Met Gln Ile Phe Val Lys Thr Leu Glu Glu Lys Tyr Ile Thr Leu Glu
1               5                   10                  15

Val Glu Pro Ser Asp Thr Ile Ala Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala
65                  70                  75

<210> SEQ ID NO 20
<211> LENGTH: 76
<212> TYPE: PRT
<213> ORGANISM: Artificial Sequence
<220> FEATURE:
<223> OTHER INFORMATION: Artificially synthesized Affilin 197014

<400> SEQUENCE: 20

Met Gln Ile Phe Val Lys Thr Leu Glu Glu Lys Tyr Ile Pro Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala
65                  70                  75

<210> SEQ ID NO 21
<211> LENGTH: 76
<212> TYPE: PRT
<213> ORGANISM: Artificial Sequence
```

<220> FEATURE:
<223> OTHER INFORMATION: Artificially synthesized Affilin 196888

<400> SEQUENCE: 21

Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala
65                  70                  75

<210> SEQ ID NO 22
<211> LENGTH: 76
<212> TYPE: PRT
<213> ORGANISM: Artificial Sequence
<220> FEATURE:
<223> OTHER INFORMATION: Artificially synthesized Affilin 197106

<400> SEQUENCE: 22

Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asp
            20                  25                  30

Gln Ala Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala
65                  70                  75

<210> SEQ ID NO 23
<211> LENGTH: 76
<212> TYPE: PRT
<213> ORGANISM: Artificial Sequence
<220> FEATURE:
<223> OTHER INFORMATION: Artificially synthesized Affilin 197252

<400> SEQUENCE: 23

Met Gln Ile Phe Val Lys Thr Leu Glu Glu Lys Tyr Ile Thr Leu Glu
1               5                   10                  15

Val Glu Pro Ser Asp Thr Val Glu Asn Val Lys Ala Lys Ile Arg Asp
            20                  25                  30

Lys Glu Gly Ile Pro Pro Asp Gln Gln Lys Leu Leu Trp Tyr Gly Lys
        35                  40                  45

Gln Leu Glu Gly Gly Arg Thr Leu Ser Asp Tyr Asn Ile Leu Gly Gly
    50                  55                  60

Ala Val Leu Lys Leu Gln Leu Gly Leu Arg Ala Ala
65                  70                  75

<210> SEQ ID NO 24
<211> LENGTH: 76
<212> TYPE: PRT
<213> ORGANISM: Artificial Sequence
<220> FEATURE:
<223> OTHER INFORMATION: Artificially synthesized Affilin 189864

<400> SEQUENCE: 24

Met Gln Ile Phe Val Val Thr Arg Leu Tyr Lys Glu Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Tyr Leu Tyr Trp Asp Gly Lys
        35                  40                  45

Gln Leu Glu Asp Gly Arg Thr Leu Ser Asp Tyr Asn Ile Arg Phe Gly
    50                  55                  60

Asp His Leu Asp Leu Thr Leu Gly Leu Arg Ala Ala
65                  70                  75

<210> SEQ ID NO 25
<211> LENGTH: 76
<212> TYPE: PRT
<213> ORGANISM: Artificial Sequence
<220> FEATURE:
<223> OTHER INFORMATION: Artificially synthesized Affilin 189872

<400> SEQUENCE: 25

Met Gln Ile Phe Val Val Thr Arg Leu Tyr Lys Glu Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Tyr Leu Tyr Gly Asp Gly Lys
        35                  40                  45

Gln Leu Glu Asp Gly Arg Thr Leu Ser Asp Tyr Asn Ile Arg Phe Gly
    50                  55                  60

Asp His Leu Asp Leu Thr Leu Gly Leu Arg Ala Ala
65                  70                  75

<210> SEQ ID NO 26
<211> LENGTH: 76
<212> TYPE: PRT
<213> ORGANISM: Artificial Sequence
<220> FEATURE:
<223> OTHER INFORMATION: Artificially synthesized Affilin 181919

<400> SEQUENCE: 26

Met Gln Ile Phe Val Val Thr Arg Leu Tyr Lys Glu Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Tyr Leu Tyr Trp Asp Gly Lys
        35                  40                  45

Gln Leu Glu Asp Gly Arg Thr Leu Ser Asp Tyr Asn Ile Arg Phe Gly
    50                  55                  60

Tyr His Leu Asp Leu Thr Leu Gly Leu Arg Ala Ala
65                  70                  75

<210> SEQ ID NO 27
<211> LENGTH: 76
<212> TYPE: PRT
<213> ORGANISM: Artificial Sequence
<220> FEATURE:
<223> OTHER INFORMATION: Artificially synthesized Affilin 189853

<400> SEQUENCE: 27

Met Gln Ile Phe Val Val Thr Arg Leu Tyr Lys Glu Thr Ala Leu Glu
1               5                   10                  15

Val Glu Pro Ser Asp Thr Ile Glu Asn Val Lys Ala Lys Ile Gln Asp
                20                  25                  30

Lys Glu Gly Ile Pro Pro Asp Gln Gln Tyr Leu Tyr Trp Asp Gly Lys
            35                  40                  45

Gln Leu Glu Asp Gly Arg Thr Leu Ser Asp Tyr Asn Ile Arg Phe Gly
        50                  55                  60

Tyr His Leu Asp Leu Thr Leu Gly Leu Arg Ala Ala
65                  70                  75

<210> SEQ ID NO 28
<211> LENGTH: 76
<212> TYPE: PRT
<213> ORGANISM: Artificial Sequence
<220> FEATURE:
<223> OTHER INFORMATION: Artificially synthesized Affilin 187770

<400> SEQUENCE: 28

Met Gln Ile Phe Val Val Thr Glu Ser Tyr Lys Trp Ile Thr Leu Glu
1               5                   10                  15

Val Glu Pro Ser Asp Thr Ile Glu Asn Val Lys Ala Lys Ile Gln Asp
                20                  25                  30

Lys Glu Gly Ile Pro Pro Asp Gln Gln Gln Leu Val Trp Asp Gly Lys
            35                  40                  45

Gln Leu Glu Asp Gly Arg Thr Leu Ser Asp Tyr Asn Ile Asp Leu Gly
        50                  55                  60

Gly Tyr Leu Pro Leu Trp Leu Tyr Leu Arg Ala Ala
65                  70                  75

<210> SEQ ID NO 29
<211> LENGTH: 76
<212> TYPE: PRT
<213> ORGANISM: Artificial Sequence
<220> FEATURE:
<223> OTHER INFORMATION: Artificially synthesized Affilin 187803

<400> SEQUENCE: 29

Met Gln Ile Phe Val Gln Thr Tyr Asn Ile Lys Asp Ile Thr Leu Glu
1               5                   10                  15

Val Glu Pro Ser Asp Thr Ile Glu Asn Val Lys Ala Lys Ile Gln Asp
                20                  25                  30

Lys Glu Gly Ile Pro Pro Asp Gln Gln Met Leu Phe Trp Ser Gly Lys
            35                  40                  45

Gln Leu Glu Asp Gly Arg Thr Leu Ser Asp Tyr Asn Ile Ile Ala Tyr
        50                  55                  60

Met Thr Leu Thr Leu His Leu Lys Leu Arg Ala Ala
65                  70                  75

<210> SEQ ID NO 30
<211> LENGTH: 168
<212> TYPE: PRT
<213> ORGANISM: Artificial Sequence
<220> FEATURE:
<223> OTHER INFORMATION: Artificially synthesized Affilin 199490

<400> SEQUENCE: 30

```
Met Gln Ile Phe Val Lys Thr Leu Glu Glu Lys Tyr Ile Ala Leu Glu
1               5                   10                  15

Val Glu Pro Ser Asp Thr Ile Glu Asn Val Lys Ala Lys Val Gln Asp
            20                  25                  30

Lys Glu Gly Ile Pro Pro Asp Gln Gln Glu Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Gly Gly Ser Gly
65                  70                  75                  80

Gly Gly Ser Gly Gly Gly Ser Gly Gly Gly Ser Gly Met Gln Ile Phe
                85                  90                  95

Val Lys Thr Leu Glu Glu Lys Tyr Ile Ala Leu Glu Val Glu Pro Ser
            100                 105                 110

Asp Thr Ile Glu Asn Val Lys Ala Lys Val Gln Asp Lys Glu Gly Ile
        115                 120                 125

Pro Pro Asp Gln Gln Glu Leu Leu Trp Tyr Gly Glu Gln Leu Glu Asp
    130                 135                 140

Gly Arg Thr Leu Ser Asp Tyr Asn Ile Leu Gly Gly Ala Val Leu Lys
145                 150                 155                 160

Leu Gln Leu Arg Leu Arg Ala Ala
                165
```

<210> SEQ ID NO 31
<211> LENGTH: 152
<212> TYPE: PRT
<213> ORGANISM: Artificial Sequence
<220> FEATURE:
<223> OTHER INFORMATION: Artificially synthesized Affilin 199489; dimer of SEQ ID NO: 2

<400> SEQUENCE: 31

```
Met Gln Ile Phe Val Lys Thr Leu Glu Glu Lys Tyr Ile Ala Leu Glu
1               5                   10                  15

Val Glu Pro Ser Asp Thr Ile Glu Asn Val Lys Ala Lys Val Gln Asp
            20                  25                  30

Lys Glu Gly Ile Pro Pro Asp Gln Gln Glu Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Met Gln Ile Phe
65                  70                  75                  80

Val Lys Thr Leu Glu Glu Lys Tyr Ile Ala Leu Glu Val Glu Pro Ser
                85                  90                  95

Asp Thr Ile Glu Asn Val Lys Ala Lys Val Gln Asp Lys Glu Gly Ile
            100                 105                 110

Pro Pro Asp Gln Gln Glu Leu Leu Trp Tyr Gly Glu Gln Leu Glu Asp
        115                 120                 125

Gly Arg Thr Leu Ser Asp Tyr Asn Ile Leu Gly Gly Ala Val Leu Lys
    130                 135                 140

Leu Gln Leu Arg Leu Arg Ala Ala
145                 150
```

<210> SEQ ID NO 32

```
<211> LENGTH: 168
<212> TYPE: PRT
<213> ORGANISM: Artificial Sequence
<220> FEATURE:
<223> OTHER INFORMATION: Artificially synthesized Affilin 199484;
      homodimer of SEQ ID NO 4

<400> SEQUENCE: 32

Met Gln Ile Phe Val Lys Thr Leu Glu Glu Lys Tyr Thr Thr Leu Glu
1               5                   10                  15

Val Glu Pro Ser Asp Thr Ile Glu Asn Val Lys Ala Arg Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Gly Gly Ser Gly
65                  70                  75                  80

Gly Gly Ser Gly Gly Gly Ser Gly Gly Gly Ser Gly Met Gln Ile Phe
                85                  90                  95

Val Lys Thr Leu Glu Glu Lys Tyr Thr Thr Leu Glu Val Glu Pro Ser
            100                 105                 110

Asp Thr Ile Glu Asn Val Lys Ala Arg Ile Gln Asp Lys Glu Gly Ile
        115                 120                 125

Pro Pro Asp Gln Gln Lys Leu Leu Trp Tyr Gly Glu Gln Leu Glu Asp
    130                 135                 140

Gly Arg Thr Leu Ser Asp Tyr Asn Ile Leu Gly Gly Ala Val Leu Lys
145                 150                 155                 160

Leu Gln Leu Arg Leu Arg Ala Ala
                165

<210> SEQ ID NO 33
<211> LENGTH: 152
<212> TYPE: PRT
<213> ORGANISM: Artificial Sequence
<220> FEATURE:
<223> OTHER INFORMATION: Artificially synthesized Affilin 199483;
      homodimer of SEQ ID NO: 4

<400> SEQUENCE: 33

Met Gln Ile Phe Val Lys Thr Leu Glu Glu Lys Tyr Thr Thr Leu Glu
1               5                   10                  15

Val Glu Pro Ser Asp Thr Ile Glu Asn Val Lys Ala Arg Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Met Gln Ile Phe
65                  70                  75                  80

Val Lys Thr Leu Glu Glu Lys Tyr Thr Thr Leu Glu Val Glu Pro Ser
                85                  90                  95

Asp Thr Ile Glu Asn Val Lys Ala Arg Ile Gln Asp Lys Glu Gly Ile
            100                 105                 110

Pro Pro Asp Gln Gln Lys Leu Leu Trp Tyr Gly Glu Gln Leu Glu Asp
        115                 120                 125

Gly Arg Thr Leu Ser Asp Tyr Asn Ile Leu Gly Gly Ala Val Leu Lys
    130                 135                 140
```

```
Leu Gln Leu Arg Leu Arg Ala Ala
145                 150
```

<210> SEQ ID NO 34
<211> LENGTH: 168
<212> TYPE: PRT
<213> ORGANISM: Artificial Sequence
<220> FEATURE:
<223> OTHER INFORMATION: Artificially synthesized Affilin 199488;
      homodimer of SEQ ID NO: 5

<400> SEQUENCE: 34

```
Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Arg Val Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Gly Gly Ser Gly
65                  70                  75                  80

Gly Gly Ser Gly Gly Gly Ser Gly Gly Gly Ser Gly Met Gln Ile Phe
                85                  90                  95

Val Lys Thr Leu Glu Glu Lys Tyr Ile Thr Leu Glu Val Glu Pro Ser
            100                 105                 110

Asp Thr Ile Glu Asn Val Lys Ala Arg Val Gln Asp Lys Glu Gly Ile
        115                 120                 125

Pro Pro Asp Gln Gln Lys Leu Leu Trp Tyr Gly Glu Gln Leu Glu Asp
    130                 135                 140

Gly Arg Thr Leu Ser Asp Tyr Asn Ile Leu Gly Gly Ala Val Leu Lys
145                 150                 155                 160

Leu Gln Leu Arg Leu Arg Ala Ala
                165
```

<210> SEQ ID NO 35
<211> LENGTH: 152
<212> TYPE: PRT
<213> ORGANISM: Artificial Sequence
<220> FEATURE:
<223> OTHER INFORMATION: Artificially synthesized Affilin 199487;
      homodimer of SEQ ID NO: 5

<400> SEQUENCE: 35

```
Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Arg Val Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Met Gln Ile Phe
65                  70                  75                  80

Val Lys Thr Leu Glu Glu Lys Tyr Ile Thr Leu Glu Val Glu Pro Ser
                85                  90                  95

Asp Thr Ile Glu Asn Val Lys Ala Arg Val Gln Asp Lys Glu Gly Ile
            100                 105                 110
```

```
Pro Pro Asp Gln Gln Lys Leu Leu Trp Tyr Gly Gln Leu Glu Asp
        115                 120                 125

Gly Arg Thr Leu Ser Asp Tyr Asn Ile Leu Gly Gly Ala Val Leu Lys
        130                 135                 140

Leu Gln Leu Arg Leu Arg Ala Ala
145                 150
```

```
<210> SEQ ID NO 36
<211> LENGTH: 168
<212> TYPE: PRT
<213> ORGANISM: Artificial Sequence
<220> FEATURE:
<223> OTHER INFORMATION: Artificially synthesized Affilin 199478;
      homodimer of SEQ ID NO: 6

<400> SEQUENCE: 36
```

```
Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Gly Gly Ser Gly
65                  70                  75                  80

Gly Gly Ser Gly Gly Ser Gly Gly Ser Gly Met Gln Ile Phe
                85                  90                  95

Val Lys Thr Leu Glu Glu Lys Tyr Ile Thr Leu Glu Val Glu Pro Ser
            100                 105                 110

Asp Thr Ile Glu Asn Val Lys Ala Lys Ile Gln Asp Lys Glu Gly Ile
        115                 120                 125

Pro Pro Asp Gln Gln Lys Leu Leu Trp Tyr Gly Lys Gln Leu Glu Asp
    130                 135                 140

Gly Arg Thr Leu Ser Asp Tyr Asn Ile Leu Gly Gly Ala Val Leu Lys
145                 150                 155                 160

Leu Gln Leu Arg Leu Arg Ala Ala
                165
```

```
<210> SEQ ID NO 37
<211> LENGTH: 152
<212> TYPE: PRT
<213> ORGANISM: Artificial Sequence
<220> FEATURE:
<223> OTHER INFORMATION: Artificially synthesized Affilin 199477;
      homodimer of SEQ ID NO: 6

<400> SEQUENCE: 37
```

```
Met Gln Ile Phe Val Lys Thr Leu Glu Glu Lys Tyr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Met Gln Ile Phe
65                  70                  75                  80
```

```
Val Lys Thr Leu Glu Glu Lys Tyr Ile Thr Leu Glu Val Glu Pro Ser
                85                  90                  95

Asp Thr Ile Glu Asn Val Lys Ala Lys Ile Gln Asp Lys Glu Gly Ile
            100                 105                 110

Pro Pro Asp Gln Gln Lys Leu Leu Trp Tyr Gly Lys Gln Leu Glu Asp
        115                 120                 125

Gly Arg Thr Leu Ser Asp Tyr Asn Ile Leu Gly Gly Ala Val Leu Lys
    130                 135                 140

Leu Gln Leu Arg Leu Arg Ala Ala
145                 150

<210> SEQ ID NO 38
<211> LENGTH: 152
<212> TYPE: PRT
<213> ORGANISM: Artificial Sequence
<220> FEATURE:
<223> OTHER INFORMATION: Artificially synthesized Affilin 199479;
      homodimer of SEQ ID NO 18

<400> SEQUENCE: 38

Met Gln Ile Phe Val Lys Thr Leu Glu Glu Arg Tyr Ile Thr Leu Glu
1               5                   10                  15

Val Glu Pro Ser Asp Thr Ile Gly Asn Val Lys Ala Lys Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Asp
    50                  55                  60

Ala Val Leu Lys Leu Gln Leu Arg Leu Arg Ala Ala Met Gln Ile Phe
65                  70                  75                  80

Val Lys Thr Leu Glu Glu Arg Tyr Ile Thr Leu Glu Val Glu Pro Ser
                85                  90                  95

Asp Thr Ile Gly Asn Val Lys Ala Lys Ile Gln Asp Lys Glu Gly Ile
            100                 105                 110

Pro Pro Asp Gln Gln Lys Leu Leu Trp Tyr Gly Glu Gln Leu Glu Asp
        115                 120                 125

Gly Arg Thr Leu Ser Asp Tyr Asn Ile Leu Gly Asp Ala Val Leu Lys
    130                 135                 140

Leu Gln Leu Arg Leu Arg Ala Ala
145                 150

<210> SEQ ID NO 39
<211> LENGTH: 162
<212> TYPE: PRT
<213> ORGANISM: Artificial Sequence
<220> FEATURE:
<223> OTHER INFORMATION: Artificially synthesized Affilin 199480;
      homodimer of SEQ ID NO. 18

<400> SEQUENCE: 39

Met Gln Ile Phe Val Lys Thr Leu Glu Glu Arg Tyr Ile Thr Leu Glu
1               5                   10                  15

Val Glu Pro Ser Asp Thr Ile Gly Asn Val Lys Ala Lys Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Asp
    50                  55                  60
```

Ala Val Leu Lys Leu Gln Leu Arg Leu Arg Ala Ala Gly Gly Ser Gly
65                  70                  75                  80

Gly Gly Ser Gly Gly Gly Met Gln Ile Phe Val Lys Thr Leu Glu Glu
                85                  90                  95

Arg Tyr Ile Thr Leu Glu Val Glu Pro Ser Asp Thr Ile Gly Asn Val
            100                 105                 110

Lys Ala Lys Ile Gln Asp Lys Glu Gly Ile Pro Pro Asp Gln Gln Lys
        115                 120                 125

Leu Leu Trp Tyr Gly Glu Gln Leu Glu Asp Gly Arg Thr Leu Ser Asp
    130                 135                 140

Tyr Asn Ile Leu Gly Asp Ala Val Leu Lys Leu Gln Leu Arg Leu Arg
145                 150                 155                 160

Ala Ala

<210> SEQ ID NO 40
<211> LENGTH: 168
<212> TYPE: PRT
<213> ORGANISM: Artificial Sequence
<220> FEATURE:
<223> OTHER INFORMATION: Artificially synthesized Affilin 199481;
      homodimer of SEQ ID NO 18

<400> SEQUENCE: 40

Met Gln Ile Phe Val Lys Thr Leu Glu Glu Arg Tyr Ile Thr Leu Glu
1               5                   10                  15

Val Glu Pro Ser Asp Thr Ile Gly Asn Val Lys Ala Lys Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Asp
    50                  55                  60

Ala Val Leu Lys Leu Gln Leu Arg Leu Arg Ala Ala Gly Gly Ser Gly
65                  70                  75                  80

Gly Gly Ser Gly Gly Gly Ser Gly Gly Gly Ser Gly Met Gln Ile Phe
                85                  90                  95

Val Lys Thr Leu Glu Glu Arg Tyr Ile Thr Leu Glu Val Glu Pro Ser
            100                 105                 110

Asp Thr Ile Gly Asn Val Lys Ala Lys Ile Gln Asp Lys Glu Gly Ile
        115                 120                 125

Pro Pro Asp Gln Gln Lys Leu Leu Trp Tyr Gly Glu Gln Leu Glu Asp
    130                 135                 140

Gly Arg Thr Leu Ser Asp Tyr Asn Ile Leu Gly Asp Ala Val Leu Lys
145                 150                 155                 160

Leu Gln Leu Arg Leu Arg Ala Ala
                165

<210> SEQ ID NO 41
<211> LENGTH: 172
<212> TYPE: PRT
<213> ORGANISM: Artificial Sequence
<220> FEATURE:
<223> OTHER INFORMATION: Artificially synthesized Affilin 199482;
      homodimer of SEQ ID NO 18

<400> SEQUENCE: 41

Met Gln Ile Phe Val Lys Thr Leu Glu Glu Arg Tyr Ile Thr Leu Glu
1               5                   10                  15

```
Val Glu Pro Ser Asp Thr Ile Gly Asn Val Lys Ala Lys Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Asp
    50                  55                  60

Ala Val Leu Lys Leu Gln Leu Arg Leu Arg Ala Ala Gly Gly Ser Gly
65                  70                  75                  80

Gly Gly Ser Gly Gly Ser Gly Gly Gly Ser Gly Gly Ser Gly
                85                  90                  95

Met Gln Ile Phe Val Lys Thr Leu Glu Glu Arg Tyr Ile Thr Leu Glu
            100                 105                 110

Val Glu Pro Ser Asp Thr Ile Gly Asn Val Lys Ala Lys Ile Gln Asp
        115                 120                 125

Lys Glu Gly Ile Pro Pro Asp Gln Gln Lys Leu Leu Trp Tyr Gly Glu
    130                 135                 140

Gln Leu Glu Asp Gly Arg Thr Leu Ser Asp Tyr Asn Ile Leu Gly Asp
145                 150                 155                 160

Ala Val Leu Lys Leu Gln Leu Arg Leu Arg Ala Ala
                165                 170

<210> SEQ ID NO 42
<211> LENGTH: 168
<212> TYPE: PRT
<213> ORGANISM: Artificial Sequence
<220> FEATURE:
<223> OTHER INFORMATION: Artificially synthesized Affilin 199486;
      homodimer of SEQ ID NO 20

<400> SEQUENCE: 42

Met Gln Ile Phe Val Lys Thr Leu Glu Glu Lys Tyr Ile Pro Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala Gly Gly Ser Gly
65                  70                  75                  80

Gly Gly Ser Gly Gly Gly Ser Gly Gly Gly Ser Gly Met Gln Ile Phe
                85                  90                  95

Val Lys Thr Leu Glu Glu Lys Tyr Ile Pro Leu Glu Val Glu Pro Ser
            100                 105                 110

Asp Thr Ile Glu Asn Val Lys Ala Lys Ile Gln Asp Lys Glu Gly Ile
        115                 120                 125

Pro Pro Asp Gln Gln Lys Leu Leu Trp Tyr Gly Lys Gln Leu Glu Asp
    130                 135                 140

Gly Arg Thr Leu Ser Asp Tyr Asn Ile Leu Gly Gly Ala Val Leu Lys
145                 150                 155                 160

Leu Pro Leu Arg Leu Arg Ala Ala
                165

<210> SEQ ID NO 43
<211> LENGTH: 152
<212> TYPE: PRT
<213> ORGANISM: Artificial Sequence
```

<220> FEATURE:
<223> OTHER INFORMATION: Artificially synthesized Affilin 199485;
      homodimer of SEQ ID NO: 20

<400> SEQUENCE: 43

```
Met Gln Ile Phe Val Lys Thr Leu Glu Glu Lys Tyr Ile Pro Leu Glu
1               5                  10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala Met Gln Ile Phe
65                  70                  75                  80

Val Lys Thr Leu Glu Glu Lys Tyr Ile Pro Leu Glu Val Glu Pro Ser
                85                  90                  95

Asp Thr Ile Glu Asn Val Lys Ala Lys Ile Gln Asp Lys Glu Gly Ile
            100                 105                 110

Pro Pro Asp Gln Gln Lys Leu Leu Trp Tyr Gly Lys Gln Leu Glu Asp
        115                 120                 125

Gly Arg Thr Leu Ser Asp Tyr Asn Ile Leu Gly Gly Ala Val Leu Lys
    130                 135                 140

Leu Pro Leu Arg Leu Arg Ala Ala
145                 150
```

<210> SEQ ID NO 44
<211> LENGTH: 171
<212> TYPE: PRT
<213> ORGANISM: Artificial Sequence
<220> FEATURE:
<223> OTHER INFORMATION: Artificially synthesized Affilin 202521
      (199490); homodimer of SEQ ID NO 2 with C-terminal SAC but no
      Streptag

<400> SEQUENCE: 44

```
Met Gln Ile Phe Val Lys Thr Leu Glu Glu Lys Tyr Ile Ala Leu Glu
1               5                  10                  15

Val Glu Pro Ser Asp Thr Ile Glu Asn Val Lys Ala Lys Val Gln Asp
            20                  25                  30

Lys Glu Gly Ile Pro Pro Asp Gln Gln Glu Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Gly Gly Ser Gly
65                  70                  75                  80

Gly Gly Ser Gly Gly Ser Gly Gly Gly Ser Gly Met Gln Ile Phe
                85                  90                  95

Val Lys Thr Leu Glu Glu Lys Tyr Ile Ala Leu Glu Val Glu Pro Ser
                100                 105                 110

Asp Thr Ile Glu Asn Val Lys Ala Lys Val Gln Asp Lys Glu Gly Ile
            115                 120                 125

Pro Pro Asp Gln Gln Glu Leu Leu Trp Tyr Gly Glu Gln Leu Glu Asp
        130                 135                 140

Gly Arg Thr Leu Ser Asp Tyr Asn Ile Leu Gly Gly Ala Val Leu Lys
145                 150                 155                 160
```

Leu Gln Leu Arg Leu Arg Ala Ala Ser Ala Cys
            165                 170

<210> SEQ ID NO 45
<211> LENGTH: 181
<212> TYPE: PRT
<213> ORGANISM: Artificial Sequence
<220> FEATURE:
<223> OTHER INFORMATION: Artificially synthesized Affilin 199490;
      (homodimer of SEQ ID NO 2) with c-terminal SAC and Streptag

<400> SEQUENCE: 45

Met Gln Ile Phe Val Lys Thr Leu Glu Glu Lys Tyr Ile Ala Leu Glu
1               5                   10                  15

Val Glu Pro Ser Asp Thr Ile Glu Asn Val Lys Ala Lys Val Gln Asp
            20                  25                  30

Lys Glu Gly Ile Pro Pro Asp Gln Gln Glu Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Leu Arg Leu Arg Ala Ala Gly Gly Ser Gly
65                  70                  75                  80

Gly Gly Ser Gly Gly Gly Ser Gly Gly Ser Gly Met Gln Ile Phe
                85                  90                  95

Val Lys Thr Leu Glu Glu Lys Tyr Ile Ala Leu Glu Val Glu Pro Ser
                100                 105                 110

Asp Thr Ile Glu Asn Val Lys Ala Lys Val Gln Asp Lys Glu Gly Ile
            115                 120                 125

Pro Pro Asp Gln Gln Glu Leu Leu Trp Tyr Gly Glu Gln Leu Glu Asp
        130                 135                 140

Gly Arg Thr Leu Ser Asp Tyr Asn Ile Leu Gly Gly Ala Val Leu Lys
145                 150                 155                 160

Leu Gln Leu Arg Leu Arg Ala Ala Ser Ala Cys Ala Ser Trp Ser His
                165                 170                 175

Pro Gln Phe Glu Lys
            180

<210> SEQ ID NO 46
<211> LENGTH: 76
<212> TYPE: PRT
<213> ORGANISM: Artificial Sequence
<220> FEATURE:
<223> OTHER INFORMATION: Artificially synthesized ubiquitin

<400> SEQUENCE: 46

Met Gln Ile Phe Val Lys Thr Leu Thr Gly Lys Thr Ile Thr Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Arg Leu Ile Trp Ala Gly Lys
        35                  40                  45

Gln Leu Glu Asp Gly Arg Thr Leu Ser Asp Tyr Asn Ile Gln Lys Glu
    50                  55                  60

Ser Thr Leu His Leu Val Leu Arg Leu Arg Ala Ala
65                  70                  75

<210> SEQ ID NO 47
<211> LENGTH: 9

```
<212> TYPE: PRT
<213> ORGANISM: Artificial Sequence
<220> FEATURE:
<223> OTHER INFORMATION: Artificially synthesized motif 62-70

<400> SEQUENCE: 47

Leu Gly Gly Ala Val Leu Lys Leu Gln
1               5

<210> SEQ ID NO 48
<211> LENGTH: 9
<212> TYPE: PRT
<213> ORGANISM: Artificial Sequence
<220> FEATURE:
<223> OTHER INFORMATION: Artificially synthesized motif 62-70

<400> SEQUENCE: 48

Leu Gly Asp Ala Val Leu Lys Leu Gln
1               5

<210> SEQ ID NO 49
<211> LENGTH: 9
<212> TYPE: PRT
<213> ORGANISM: Artificial Sequence
<220> FEATURE:
<223> OTHER INFORMATION: Artificially synthesized motif 62-70

<400> SEQUENCE: 49

Leu Gly Gly Ala Val Leu Lys Leu Pro
1               5

<210> SEQ ID NO 50
<211> LENGTH: 9
<212> TYPE: PRT
<213> ORGANISM: Artificial Sequence
<220> FEATURE:
<223> OTHER INFORMATION: Artificially synthesized motif 62-70

<400> SEQUENCE: 50

Arg Phe Gly Asp His Leu Asp Leu Thr
1               5

<210> SEQ ID NO 51
<211> LENGTH: 9
<212> TYPE: PRT
<213> ORGANISM: Artificial Sequence
<220> FEATURE:
<223> OTHER INFORMATION: Artificially synthesized motif 62-70

<400> SEQUENCE: 51

Arg Phe Gly Tyr His Leu Asp Leu Thr
1               5

<210> SEQ ID NO 52
<211> LENGTH: 9
<212> TYPE: PRT
<213> ORGANISM: Artificial Sequence
<220> FEATURE:
<223> OTHER INFORMATION: Artificially synthesized motif 62-70

<400> SEQUENCE: 52

Asp Leu Gly Gly Tyr Leu Pro Leu Trp
1               5

<210> SEQ ID NO 53
<211> LENGTH: 9
<212> TYPE: PRT
```

```
<213> ORGANISM: Artificial Sequence
<220> FEATURE:
<223> OTHER INFORMATION: Artificially synthesized motif 62-70

<400> SEQUENCE: 53

Ile Ala Tyr Met Thr Leu Thr Leu His
1               5

<210> SEQ ID NO 54
<211> LENGTH: 5
<212> TYPE: PRT
<213> ORGANISM: Artificial Sequence
<220> FEATURE:
<223> OTHER INFORMATION: Artificially synthesized motif 42-46

<400> SEQUENCE: 54

Glu Leu Leu Trp Tyr
1               5

<210> SEQ ID NO 55
<211> LENGTH: 5
<212> TYPE: PRT
<213> ORGANISM: Artificial Sequence
<220> FEATURE:
<223> OTHER INFORMATION: Artificially synthesized motif 42-46

<400> SEQUENCE: 55

Lys Leu Leu Trp Tyr
1               5

<210> SEQ ID NO 56
<211> LENGTH: 5
<212> TYPE: PRT
<213> ORGANISM: Artificial Sequence
<220> FEATURE:
<223> OTHER INFORMATION: Artificially synthesized motif 42-46

<400> SEQUENCE: 56

Lys Leu Leu Arg Tyr
1               5

<210> SEQ ID NO 57
<211> LENGTH: 5
<212> TYPE: PRT
<213> ORGANISM: Artificial Sequence
<220> FEATURE:
<223> OTHER INFORMATION: Artificially synthesized motif 42-46

<400> SEQUENCE: 57

Tyr Leu Tyr Trp Asp
1               5

<210> SEQ ID NO 58
<211> LENGTH: 5
<212> TYPE: PRT
<213> ORGANISM: Artificial Sequence
<220> FEATURE:
<223> OTHER INFORMATION: Artificially synthesized motif 42-46

<400> SEQUENCE: 58

Tyr Leu Tyr Gly Asp
1               5

<210> SEQ ID NO 59
<211> LENGTH: 5
<212> TYPE: PRT
<213> ORGANISM: Artificial Sequence
```

```
<220> FEATURE:
<223> OTHER INFORMATION: Artificially synthesized motif 42-46

<400> SEQUENCE: 59

Gln Leu Val Trp Asp
1               5

<210> SEQ ID NO 60
<211> LENGTH: 5
<212> TYPE: PRT
<213> ORGANISM: Artificial Sequence
<220> FEATURE:
<223> OTHER INFORMATION: Artificially synthesized motif 42-46

<400> SEQUENCE: 60

Met Leu Phe Trp Ser
1               5

<210> SEQ ID NO 61
<211> LENGTH: 4
<212> TYPE: PRT
<213> ORGANISM: Artificial Sequence
<220> FEATURE:
<223> OTHER INFORMATION: Artificially synthesized motif 9-12

<400> SEQUENCE: 61

Glu Glu Lys Tyr
1

<210> SEQ ID NO 62
<211> LENGTH: 4
<212> TYPE: PRT
<213> ORGANISM: Artificial Sequence
<220> FEATURE:
<223> OTHER INFORMATION: Artificially synthesized motif 9-12

<400> SEQUENCE: 62

Glu Glu Arg Tyr
1

<210> SEQ ID NO 63
<211> LENGTH: 4
<212> TYPE: PRT
<213> ORGANISM: Artificial Sequence
<220> FEATURE:
<223> OTHER INFORMATION: Artificially synthesized motif 9-12

<400> SEQUENCE: 63

Glu Gln Lys Tyr
1

<210> SEQ ID NO 64
<211> LENGTH: 4
<212> TYPE: PRT
<213> ORGANISM: Artificial Sequence
<220> FEATURE:
<223> OTHER INFORMATION: Artificially synthesized motif 9-12

<400> SEQUENCE: 64

Leu Tyr Lys Glu
1

<210> SEQ ID NO 65
<211> LENGTH: 4
<212> TYPE: PRT
<213> ORGANISM: Artificial Sequence
<220> FEATURE:
```

```
<223> OTHER INFORMATION: Artificially synthesized motif 9-12

<400> SEQUENCE: 65

Ser Tyr Lys Trp
1

<210> SEQ ID NO 66
<211> LENGTH: 4
<212> TYPE: PRT
<213> ORGANISM: Artificial Sequence
<220> FEATURE:
<223> OTHER INFORMATION: Artificially synthesized motif 9-12

<400> SEQUENCE: 66

Asn Ile Lys Asp
1

<210> SEQ ID NO 67
<211> LENGTH: 16
<212> TYPE: PRT
<213> ORGANISM: Artificial Sequence
<220> FEATURE:
<223> OTHER INFORMATION: Artificially synthesized linker

<400> SEQUENCE: 67

Gly Gly Ser Gly Gly Gly Ser Gly Gly Gly Ser Gly Gly Gly Ser Gly
1               5                   10                  15

<210> SEQ ID NO 68
<211> LENGTH: 10
<212> TYPE: PRT
<213> ORGANISM: Artificial Sequence
<220> FEATURE:
<223> OTHER INFORMATION: Artificially synthesized c-terminal sequence
      (StrepTaq)

<400> SEQUENCE: 68

Ala Ser Trp Ser His Pro Gln Phe Glu Lys
1               5                   10

<210> SEQ ID NO 69
<211> LENGTH: 76
<212> TYPE: PRT
<213> ORGANISM: Artificial Sequence
<220> FEATURE:
<223> OTHER INFORMATION: Artificially synthesized Affilin 197103 E10Q

<400> SEQUENCE: 69

Met Gln Ile Phe Val Lys Thr Leu Glu Gln Lys Tyr Ile Thr Leu Glu
1               5                   10                  15

Val Glu Pro Ser Asp Thr Thr Glu Asp Val Lys Ala Lys Ile Gln Asp
            20                  25                  30

Lys Glu Gly Ile Pro Pro Asp Gln Gln Lys Leu Leu Trp Tyr Gly Glu
        35                  40                  45

Gln Leu Glu Asp Gly Arg Thr Leu Ser Asp Tyr Asn Ile Leu Gly Gly
    50                  55                  60

Ala Val Leu Lys Leu Gln Pro Arg Leu Arg Ala Ala
65                  70                  75

<210> SEQ ID NO 70
<211> LENGTH: 76
<212> TYPE: PRT
<213> ORGANISM: Artificial Sequence
<220> FEATURE:
<223> OTHER INFORMATION: Artificially synthesized Affilin 197312 E10Q
```

<400> SEQUENCE: 70

Met Gln Ile Phe Val Lys Thr Leu Glu Gln Lys Tyr Ile Pro Leu Glu
1               5                   10                  15

Val Glu Pro Ser Asp Thr Ile Glu Asn Val Lys Ala Thr Ile Gln Asp
            20                  25                  30

Lys Glu Gly Ile Pro Pro Asp Gln Gln Lys Leu Leu Trp Tyr Gly Lys
        35                  40                  45

Gln Leu Asp Asp Gly Arg Thr Leu Ser Asp Tyr Asn Ile Leu Gly Gly
    50                  55                  60

Ala Val Leu Lys Leu Gln Leu Arg Leu Arg Ala Ala
65                  70                  75

<210> SEQ ID NO 71
<211> LENGTH: 76
<212> TYPE: PRT
<213> ORGANISM: Artificial Sequence
<220> FEATURE:
<223> OTHER INFORMATION: Artificially synthesized Affilin 197014 E10Q

<400> SEQUENCE: 71

Met Gln Ile Phe Val Lys Thr Leu Glu Gln Lys Tyr Ile Pro Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala
65                  70                  75

<210> SEQ ID NO 72
<211> LENGTH: 168
<212> TYPE: PRT
<213> ORGANISM: Artificial Sequence
<220> FEATURE:
<223> OTHER INFORMATION: Artificially synthesized Affilin 199486 E10Q

<400> SEQUENCE: 72

Met Gln Ile Phe Val Lys Thr Leu Glu Gln Lys Tyr Ile Pro Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala Gly Gly Ser Gly
65                  70                  75                  80

Gly Gly Ser Gly Gly Ser Gly Gly Gly Ser Gly Met Gln Ile Phe
            85                  90                  95

Val Lys Thr Leu Glu Gln Lys Tyr Ile Pro Leu Glu Val Glu Pro Ser
            100                 105                 110

Asp Thr Ile Glu Asn Val Lys Ala Lys Ile Gln Asp Lys Glu Gly Ile
        115                 120                 125

Pro Pro Asp Gln Gln Lys Leu Leu Trp Tyr Gly Lys Gln Leu Glu Asp
    130                 135                 140

```
Gly Arg Thr Leu Ser Asp Tyr Asn Ile Leu Gly Gly Ala Val Leu Lys
145                 150                 155                 160

Leu Pro Leu Arg Leu Arg Ala Ala
                165
```

<210> SEQ ID NO 73
<211> LENGTH: 152
<212> TYPE: PRT
<213> ORGANISM: Artificial Sequence
<220> FEATURE:
<223> OTHER INFORMATION: Artificially synthesized Affilin 199485 E10Q

<400> SEQUENCE: 73

```
Met Gln Ile Phe Val Lys Thr Leu Glu Gln Lys Tyr Ile Pro Leu Glu
1               5                   10                  15

Val Glu Pro Ser Asp Thr Ile Glu Asn Val Lys Ala Lys Ile Gln Asp
            20                  25                  30

Lys Glu Gly Ile Pro Pro Asp Gln Gln Lys Leu Leu Trp Tyr Gly Lys
        35                  40                  45

Gln Leu Glu Asp Gly Arg Thr Leu Ser Asp Tyr Asn Ile Leu Gly Gly
    50                  55                  60

Ala Val Leu Lys Leu Pro Leu Arg Leu Arg Ala Ala Met Gln Ile Phe
65                  70                  75                  80

Val Lys Thr Leu Glu Gln Lys Tyr Ile Pro Leu Glu Val Glu Pro Ser
                85                  90                  95

Asp Thr Ile Glu Asn Val Lys Ala Lys Ile Gln Asp Lys Glu Gly Ile
            100                 105                 110

Pro Pro Asp Gln Gln Lys Leu Leu Trp Tyr Gly Lys Gln Leu Glu Asp
        115                 120                 125

Gly Arg Thr Leu Ser Asp Tyr Asn Ile Leu Gly Gly Ala Val Leu Lys
    130                 135                 140

Leu Pro Leu Arg Leu Arg Ala Ala
145                 150
```

<210> SEQ ID NO 74
<211> LENGTH: 5
<212> TYPE: PRT
<213> ORGANISM: Artificial Sequence
<220> FEATURE:
<223> OTHER INFORMATION: Artificially synthesized motif

<400> SEQUENCE: 74

```
Arg Leu Tyr Lys Glu
1               5
```

<210> SEQ ID NO 75
<211> LENGTH: 5
<212> TYPE: PRT
<213> ORGANISM: Artificial Sequence
<220> FEATURE:
<223> OTHER INFORMATION: Artificially synthesized motif

<400> SEQUENCE: 75

```
Glu Ser Tyr Lys Trp
1               5
```

<210> SEQ ID NO 76
<211> LENGTH: 5
<212> TYPE: PRT
<213> ORGANISM: Artificial Sequence
<220> FEATURE:

```
<223> OTHER INFORMATION: Artificially synthesized motif

<400> SEQUENCE: 76

Tyr Asn Ile Lys Asp
1               5
```

FOLR1 SPECIFIC BINDING PROTEINS FOR CANCER DIAGNOSIS AND TREATMENT

FIELD OF THE INVENTION

The present invention relates to new binding proteins that are specific for folate receptor alpha (FOLR1). The invention further refers to FOLR1 binding proteins that further comprises a diagnostically or therapeutically active component. Further aspects of the invention cover the use of these FOLR1 binding proteins in medicine, for example, in diagnosis and therapy of FOLR1 related cancer.

BACKGROUND OF THE INVENTION

Folate receptor alpha (FOLR1) is a glycosylphosphatidylinositol-anchored membrane protein with high affinity for binding and coordinating transport of the active form of folate to the interior of cells. FOLR1 is expressed only at low concentration and restricted distribution in normal human tissues, for instance in the proximal tubule cells of the kidneys.

In several solid tumors, FOLR1 is vastly overexpressed, particularly in solid cancer types of epithelial origin. Cancer types with the highest frequency of FOLR1 expression are ovarian, endometrial, brain, lung, and renal carcinomas. In addition, FOLR1 expression in cancer of the head and neck, breast, stomach, and colon-rectum was found at intermediate frequencies.

Ovarian cancer has the highest mortality rate of all female cancers. Elevated levels of FOLR1 were reported in almost all epithelial ovarian cancers, and are associated with a high level of tumor aggressiveness, resulting in lower disease-free intervals and poor overall survival in patients. Despite an initial response to chemotherapies, most patients experience disease recurrence due to tumor resistance to chemotherapies. Non-small cell lung cancer accounts for most lung cancers where the prognosis for patients is poor with a low 5-year all-stage survival rate. High FOLR1 tissue expression was observed in many estrogen receptor/progesterone receptor-negative breast cancers. Further, in patients with uncommon and aggressive form of thoracic cancer and pleural mesothelioma, overexpression of FOLR1 has also been detected.

Only few targeted diagnostics or therapeutics were described for tumors with high FOLR1 levels. One example for a potential treatment of FOLR1 related chemotherapy (platinum)-resistant ovarian cancer is the antibody-drug conjugate Mirvetuximab soravtansine, that is currently in clinical testing. Another monoclonal antibody in clinical testing is Farletuzumab for ovarian and lung cancer.

Diagnosis and treatment or of FOLR1 related cancer is not adequately addressed by existing options, and as a consequence, many patients do not adequately benefit from current strategies. Needless to say that there is a strong need for novel strategies for diagnosis and treatment of FOLR1 related tumors.

One objective of the present invention is the provision of molecules for specific targeting of FOLR1 for allowing targeted diagnostic and treatment options, including detection of FOLR1 positive tumors. Targeting this tumor-associated protein may offer benefit to patients with unmet need for novel diagnostic and therapeutic routes. Targeting FOLR1 suggests potentially non-toxic diagnostic and treatment approach, due to low and restricted distribution of FOLR1 in normal tissues. Thus, binding proteins with specificity for FOLR1 may enable effective medical options for cancer, and finally improve quality of life for patients.

The invention provides novel FOLR1 binding molecules for new and improved strategies in the diagnosis and treatment of FOLR1 related cancer.

The above-described objectives and advantages are achieved by the subject-matters of the enclosed claims. The present invention meets the needs presented above by providing examples for FOLR1 binding proteins. The above overview does not necessarily describe all problems solved by the present invention.

SUMMARY OF THE INVENTION

The present disclosure provides the following [1] to [15], without being specifically limited thereto:

[1] A folate receptor alpha (FOLR1) binding protein comprising an amino acid derived from ubiquitin according to the amino acid sequence of SEQ ID NO: 46, wherein the amino acids corresponding to positions 9, 10, 12, 42, 44, 46, 62, 63, 64, 65, 66, 68, and 70 of SEQ ID NO: 46 are substituted.

[2] The FOLR1 binding protein according to [1], wherein the amino acid corresponding to position 9 of SEQ ID NO: 46 is selected from E, L, S, or N, and position 10 of SEQ ID NO: 46 is selected from E, Q, Y, or I, and position 12 of SEQ ID NO: 46 is selected from Y, E, W, or D, and, position 42 of SEQ ID NO: 46 is selected from E, K, Y, Q, or M, and position 44 of SEQ ID NO: 46 is selected from L, Y, V, or F, and position 46 of SEQ ID NO: 46 is selected from Y, D, or S, and position 62 of SEQ ID NO: 46 is selected from L, R, D, or I, and position 63 of SEQ ID NO: 46 is selected from G, F, L, or A, and position 64 of SEQ ID NO: 46 is selected from G, D, or Y, and position 65 of SEQ ID NO: 46 is selected from A, D, Y, G, or M, and position 66 of SEQ ID NO: 46 is selected from V, H, Y, or T, and position 68 of SEQ ID NO: 46 is selected from K, D, P, or T, and position 70 of SEQ ID NO: 46 is selected from Q, P, T, W, or H, and optionally further one or more amino acids of SEQ ID NO: 46 are modified.

[3] The FOLR1 binding protein according to [2] comprising an amino acid with sequence identity between 70% and 85% to SEQ ID NO: 46, preferably between 75% and 83% to SEQ ID NO: 46, preferably between 76% and 83% to SEQ ID NO: 46, preferably between 79% and 83% to SEQ ID NO: 46.

[4] The FOLR1 binding protein according to any one of [1]-[3] wherein the amino acid corresponding to position 11 of SEQ ID NO: 46 is selected from K or R, and position 45 of SEQ ID NO: 46 is selected from W, R, or G.

[5] The FOLR1 binding protein according to any one of [1]-[4] comprising amino acid residues selected from EEKY (SEQ ID NO: 61), EERY (SEQ ID NO: 62), EQKY (SEQ ID NO: 63), LYKE (SEQ ID NO: 64), SYKW (SEQ ID NO: 65), or NIKD (SEQ ID NO: 66) corresponding to positions 9, 10, 11, and 12 of SEQ ID NO: 46, and selected from ELLWY (SEQ ID NO: 54), KLLWY (SEQ ID NO: 55), KLLRY (SEQ ID NO: 56), YLYWD (SEQ ID NO: 57), YLYGD (SEQ ID NO: 58), QLVWD (SEQ ID NO: 59), or MLFWS (SEQ ID NO: 60) corresponding to positions 42, 43, 44, 45, and 46 of SEQ ID NO: 46, and selected from LGGAVLKLQ (SEQ ID NO: 47), LGDAVLKLQ (SEQ ID NO: 48), LGGAVLKLP (SEQ ID NO: 49), RFGDHLDLT (SEQ ID NO: 50), RFGYHLDLT (SEQ ID NO: 51), DLGGYLPLW (SEQ ID NO: 52), or IAYMTLTLH (SEQ ID NO: 53) corresponding to positions 62, 63, 64, 65, 66, 67, 68, 69, and 70, of SEQ ID NO: 46.

[6] The FOLR1 binding protein according to any one of [1]-[5], further comprising substitutions in 1, 2, 3, 4, 5 amino acid positions, selected from positions corresponding to positions 6, 8, 13, 14, 20, 23, 24, 25, 29, 30, 31, 32, 33, 34, 48, 49, 51, 52, 58, 59, 60, 71, and 72 of SEQ ID NO:44, preferably selected from any one of K6V, K6Q, L8R, L8E, L8Y, I13T, T14A, T14P, S20C, S20G, I23T, I23V, E24G, E24A, N25D, K29R, K29E, K29T, I30V, I30L, Q31R, D32G, D32N, K33R, K33Q, E34A, K48E, Q49R, E51K, E51D, D52G, D58N, Y59H, N60T, N60S, L71P, R72G, R72Y, or R72K.

[7] The FOLR1 according to any one of [1]-[6] wherein the FOLR1 binding protein is a multimer comprising of a plurality of the FOLR1 binding protein according to any one of [1]-[6], preferably a dimer of the FOLR1 binding protein according to any one of [1]-[6], more preferably a homodimer of the FOLR1 binding protein according to any one of [1]-[6].

[8] The FOLR1 binding protein according to any one of [1]-[7], comprising or consisting of an amino acid sequence selected from the group of SEQ ID NOs: 1-45 and SEQ ID NOs: 69-73 or selected from amino acid sequences with at least 90% identity thereto, respectively.

[9] The FOLR1 binding protein according to any one of [1]-[8], further comprising one or more coupling domain(s) of 1 to 80 amino acids comprising one or more coupling sites for the coupling of chemical moieties, preferably wherein the chemical moieties are selected from any of chelators, drugs, toxins, dyes, and small molecules.

[10] The FOLR1 binding protein according to any one of [1]-[9], further comprising at least one diagnostically active moiety, optionally selected from a radionuclide, fluorescent protein, photosensitizer, dye, or enzyme, or any combination of the above.

[11] The FOLR1 binding protein according to any one of [1]-[9], further comprising at least one therapeutically active moiety, optionally selected from a monoclonal antibody or a fragment thereof, a radionuclide, a cytotoxic compound, a cytokine, a chemokine, an enzyme, or derivatives thereof, or any combination of the above.

[12] The FOLR1 binding protein according to any one of [1]-[11], further comprising at least one moiety modulating pharmacokinetics optionally selected from a polyethylene glycol, a human serum albumin, an albumin-binding protein or peptide, an immunoglobulin binding protein or peptide, or an immunoglobulin or immunoglobulin fragment, a polysaccharide, or an unstructured amino acid sequence comprising amino acids alanine, glycine, serine, proline.

[13] The FOLR1 binding protein according to any one of [1]-[12], for use in diagnosis or treatment of FOLR1 related tumors, preferably for imaging tumors and radiotherapy treatment of FOLR1 related tumors.

[14] A composition comprising the FOLR1 binding protein according to any one of [1]-[13] for use in medicine, preferably for use in the diagnosis or treatment of FOLR1 related tumors, preferably for imaging tumors and radiotherapy treatment of FOLR1 related tumors.

[15] A method of producing the FOLR1 binding protein according to any one of [1]-[13], comprising the steps of a) culturing a host cell under conditions suitable to obtain said FOLR1 binding protein and b) isolating said FOLR1 binding protein.

This summary does not necessarily describe all features of the present invention. Other embodiments come apparent from a review of the ensuing detailed description.

BRIEF DESCRIPTION OF THE FIGURES

The Figures show:

FIG. 1 shows selected amino acid sequences of folate receptor alpha (FOLR1) binding proteins. Differences to ubiquitin (SEQ ID NO: 46) are shown in grey. The numbers in the top row refer to the corresponding position in SEQ ID NO: 46.

FIG. 2. Binding of Affilin-199490 (homodimer of Affilin-197556b) with high affinity to FOLR1. Analysis via label-free interaction assays using SPR (Biacore). FOLR1 was immobilized on a CM-5 chip. The lines show different concentrations: 0, 0.1, 0.3, 0.93, 2.77, 8.3, 25, and 75 nM. After fitting the data with a 1:1 langmuir model a $K_D$ value of less than 0.5 nM was calculated for Affilin-199490.

FIG. 3. No binding of Affilin-199490 to FOLR2 (folate receptor beta) but specific binding to FOLR1 (folate receptor alpha). Analysis via label-free interaction assays using SPR (Biacore).

DETAILED DESCRIPTION OF THE INVENTION

The present inventors have developed a solution to meet the strong ongoing need in the art for expanding medical options for the diagnosis and treatment of cancer by providing novel FOLR1 binding proteins. The FOLR1 specific proteins as defined herein are functionally characterized by high specific affinity for FOLR1 but not for FOLR2. In particular, the invention provides FOLR1 binding proteins based on ubiquitin muteins (also known as Affilin® molecules). The FOLR1 binding proteins as described herein provide molecular formats with favorable physicochemical properties, high-level expression in bacteria, and allow easy production methods. The novel FOLR1 binding proteins may broaden so far unmet medical strategies for the diagnosis and therapy of FOLR1 related cancer. In particular, the FOLR1 binding proteins may be used for imaging purposes, for example, for the presence of tumor cells expressing FOLR1, and for radiotherapy treatment of tumors expressing FOLR1.

Before the present invention is described in more detail below, it is to be understood that this invention is not limited to the particular methodology, protocols and reagents described herein as these may vary. It is also to be understood that the terminology used herein is for the purpose of describing particular aspects and embodiments only and is not intended to limit the scope of the present invention which is reflected by the appended claims. Unless defined otherwise, all technical and scientific terms used herein have the same meaning as commonly understood by one of ordinary skill in the art to which this invention belongs. This includes a skilled person working in the field of protein engineering and purification, but also including a skilled person working in the field of developing new target-specific binding molecules for use in technical applications and in therapy and diagnostics.

Preferably, the terms used herein are defined as described in "A multilingual glossary of biotechnological terms: (IUPAC Recommendations)", Leuenberger, H. G. W, Nagel, B. and Kölbl, H. eds. (1995), Helvetica Chimica Acta, CH-4010 Basel, Switzerland).

Throughout this specification and the claims, which follow, unless the context requires otherwise, the word "comprise", and variants such as "comprises" and "comprising", was understood to imply the inclusion of a stated integer or step, or group of integers or steps, but not the exclusion of any other integer or step or group of integers or steps. The term "comprise(s)" or "comprising" may encompass a limitation to "consists of" or "consisting of", should such a limitation be necessary for any reason and to any extent.

Several documents (for example: patents, patent applications, scientific publications, manufacturer's specifications, instructions, GenBank Accession Number sequence submissions etc.) may be cited throughout the present specification. Nothing herein is to be construed as an admission that the invention is not entitled to antedate such disclosure by virtue of prior invention. Some of the documents cited herein may be characterized as being "incorporated by reference". In the event of a conflict between the definitions or teachings of such incorporated references and definitions or teachings recited in the present specification, the text of the present specification takes precedence.

All sequences referred to herein are disclosed in the attached sequence listing that, with its whole content and disclosure, forms part of the disclosure content of the present specification.

GENERAL DEFINITIONS OF IMPORTANT TERMS USED IN THE APPLICATION

The term "FOLR1" or "Folate receptor alpha" as used herein refers to Uniprot accession number P15328, in particular residues 25-234. The term "FOLR1" comprises all polypeptides which show a sequence identity of at least 80%, 85%, 90%, 95%, 96% or 97% or more, or 100% to the FOLR1 of Uniprot accession number P15328 (human), in particular residues 25-234, or Uniprot accession number P35846 (mouse).

The term "FOLR2" or "Folate receptor beta" as used herein refers to Uniprot accession number P14207 or to corresponding proteins in other species.

The term "FOLR1 binding protein" refers to a protein with high affinity binding to FOLR1.

The terms "protein" and "polypeptide" refer to any chain of two or more amino acids linked by peptide bonds, and does not refer to a specific length of the product. Thus, "peptides", "protein", "amino acid chain", or any other term used to refer to a chain of two or more amino acids, are included within the definition of "polypeptide", and the term "polypeptide" may be used instead of, or interchangeably with, any of these terms. The term "polypeptide" is also intended to refer to the products of post-translational modifications of the polypeptide, which are well known in the art.

The term "modification" or "amino acid modification" refers to a substitution, a deletion, or an insertion of a reference amino acid at a particular position in a parent polypeptide sequence by another amino acid. Given the known genetic code, and recombinant and synthetic DNA techniques, the skilled scientist can readily construct DNAs encoding the amino acid variants.

The term "mutein" as used herein refers to derivatives of, for example, ubiquitin as shown in SEQ ID NO: 46, or similar proteins, which differ from said amino acid sequence by amino acid exchanges, insertions, deletions or any combination thereof, provided that the mutein has a specific binding affinity to FOLR1.

The term "Affilin®" (registered trademark of Navigo Proteins GmbH) refers to non-immunoglobulin derived binding proteins.

The term "substitution" is understood as exchange of an amino acid by another amino acid. The term "insertion" comprises the addition of amino acids to the original amino acid sequence.

The term "ubiquitin" refers to ubiquitin in accordance with SEQ ID NO: 46 and to proteins with at least 95% identity, such as for example with point mutations in positions 45, 75, 76 which do not influence binding to a target (FOLR1).

The terms "binding affinity" and "binding activity" may be used herein interchangeably, and they refer to the ability of a polypeptide to bind to another protein, peptide, or fragment or domain thereof. Binding affinity is typically measured and reported by the equilibrium dissociation constant ($K_D$), which is used to evaluate and rank order strengths of bimolecular interactions. The term "fusion protein" relates to a protein comprising at least a first protein joined genetically to at least a second protein. A fusion protein is created through joining of two or more genes that originally coded for separate proteins. Fusion proteins may further comprise additional domains that are not involved in binding of the target, such as but not limited to, for example, multimerization moieties, polypeptide tags, polypeptide linkers or moieties binding to a target different from FOLR1.

The term "amino acid sequence identity" refers to a quantitative comparison of the identity (or differences) of the amino acid sequences of two or more proteins. "Percent (%) amino acid sequence identity" with respect to a reference polypeptide sequence is defined as the percentage of amino acid residues in a sequence that are identical with the amino acid residues in the reference polypeptide sequence, after aligning the sequences and introducing gaps, if necessary, to achieve the maximum percent sequence identity. To determine the sequence identity, the sequence of a query protein is aligned to the sequence of a reference protein or polypeptide.

Methods for sequence alignment are well known in the art. For example, for determining the extent of an amino acid sequence identity of an arbitrary polypeptide relative to the amino acid sequence of SEQ ID NO: 46, the SIM Local similarity program as known in the art is preferably employed. For multiple alignment analysis, Clustal Omega is preferably used, as known to someone skilled in the art.

DETAILED DESCRIPTION OF THE EMBODIMENTS OF THIS INVENTION

Structural characterization of FOLR1 binding proteins. The FOLR1 binding protein as defined herein comprises a mutein of ubiquitin. The FOLR1 binding protein comprises an amino acid based on ubiquitin in accordance with SEQ ID NO: 46 with substitutions at least in positions 9, 10, 12, 42, 44, 46, 62, 63, 64, 65, 66, 68, and 70.

In some embodiments, a FOLR1 binding protein as disclosed herein has at least 71%, 72%, 73%, 74%, 75%, 76%, 77%, 78%, or 79% sequence identity to the amino acid sequence of SEQ ID NO: 46.

In various embodiments, a FOLR1 binding protein as disclosed herein has at least 80% sequence identity to the amino sequence of SEQ ID NO: 46. A FOLR1 binding protein as disclosed herein has at least 81%, 82%, 83%, 84%, or 85% sequence identity to the amino acid sequence of SEQ ID NO: 46.

In preferred embodiments, a FOLR1 binding protein as disclosed herein may have any amino acid identity between 70% identity and 85% identity to the amino acid sequence of SEQ ID NO: 46. In even more preferred embodiments, a FOLR1 binding protein as disclosed herein may have any amino acid identity between 73% identity and 83% identity to the amino acid sequence of SEQ ID NO: 46. In even more preferred embodiments, a FOLR1 binding protein as disclosed herein may have any amino acid identity between 75% identity and 83% identity to the amino acid sequence of SEQ ID NO: 46. In even more preferred embodiments, a FOLR1 binding protein as disclosed herein may have any amino acid identity between 76% identity and 83% identity to the amino acid sequence of SEQ ID NO: 46. In even more preferred embodiments, a FOLR1 binding protein as disclosed herein may have any amino acid identity between 79% identity and 83% identity to the amino acid sequence of SEQ ID NO: 46.

The FOLR1 binding protein as defined herein comprises a mutein of SEQ ID NO: 46, i.e. comprises a mutein of ubiquitin. The FOLR1 binding protein comprises an amino acid based on SEQ ID NO: 46 with substitutions at least in positions 9, 10, 12, 42, 44, 46, 62, 63, 64, 65, 66, 68, and 70. In the FOLR1 binding protein as defined herein, the amino acid corresponding to position 9 of SEQ ID NO: 46 is E, L, S, or N, position 10 of SEQ ID NO: 46 is E, Q, Y, or I, position 12 of SEQ ID NO: 46 is Y, E, W, or D, position 42 of SEQ ID NO: 46 is E, K, Y, Q, or M, position 44 of SEQ ID NO: 46 is L, Y, V, or F, position 46 of SEQ ID NO: 46 is Y, D, or S, position 62 of SEQ ID NO: 46 is L, R, D, or I, position 63 of SEQ ID NO: 46 is G, F, L, or A, position 64 of SEQ ID NO: 46 is G, D, or Y, position 65 of SEQ ID NO: 46 is A, D, Y, G, or M, position 66 of SEQ ID NO: 46 is V, H, Y, or T, position 68 of SEQ ID NO: 46 is K, D, P, or T, and position 70 of SEQ ID NO: 46 is Q, P, T, W, or H, and optionally further one or more, preferably 1, 2, 3, 4, or 5, amino acids of SEQ ID NO: 46 are substituted. In some embodiments, the amino acid corresponding to position 11 of SEQ ID NO: 46 is K or R and position 45 of SEQ ID NO: 46 is W, R, or G.

Structural characterization by amino acid motifs. In one embodiment, the FOLR1 binding protein comprises an amino acid residue motif at positions corresponding to positions 9, 10, 11, and 12 of ubiquitin as defined in SEQ ID NO: 46 wherein the amino acid residue motif is selected from the group of EEKY, EERY, EQKY, LYKE, SYKW, or NIKD (SEQ ID NOs: 61-66).

In one embodiment, the FOLR1 binding protein comprises an amino acid residue motif at positions corresponding to positions 42, 43, 44, 45, and 46 of SEQ ID NO: 46 wherein the amino acid residue motif is selected from the group of ELLWY, KLLWY, KLLRY, YLYWD, YLYGD, QLVWD, or MLFWS (SEQ ID NOs: 54-60).

In one embodiment, the FOLR1 binding protein comprises an amino acid residue motif at positions corresponding to positions 62, 63, 64, 65, 66, 67, 68, 69, and 70 of SEQ ID NO: 46 wherein the amino acid residue motif is selected from LGGAVLKLQ, LGDAVLKLQ, LGGAVLKLP, RFGDHLDLT, RFGYHLDLT, DLGGYLPLW, or IAYMTLTLH (SEQ ID NOs: 47-53).

In one embodiment, the FOLR1 binding protein comprises an amino acid residue motif at positions corresponding to positions 9, 10, 11, and 12 of ubiquitin as defined in SEQ ID NO: 46 wherein the amino acid residue motif is selected from the group of EEKY (SEQ ID NO: 61), EERY (SEQ ID NO: 62), EQKY (SEQ ID NO: 63), LYKE (SEQ ID NO: 64), SYKW (SEQ ID NO: 65), or NIKD (SEQ ID NO: 66), and an amino acid residue motif at positions corresponding to positions 42, 43, 44, 45, and 46 of SEQ ID NO: 46 wherein the amino acid residue motif is selected from the group of ELLWY (SEQ ID NO: 54), KLLWY (SEQ ID NO: 55), KLLRY (SEQ ID NO: 56), YLYWD (SEQ ID NO: 57), YLYGD (SEQ ID NO: 58), QLVWD (SEQ ID NO: 59), or MLFWS (SEQ ID NO: 60), and an amino acid residue motif at positions corresponding to positions 62, 63, 64, 65, 66, 67, 68, 69, and 70 of SEQ ID NO: 46 wherein the amino acid residue motif is selected from LGGAVLKLQ (SEQ ID NO: 47), LGDAVLKLQ (SEQ ID NO: 48), LGGAVLKLP (SEQ ID NO: 49), RFGDHLDLT (SEQ ID NO: 50), RFGYHLDLT (SEQ ID NO: 51), DLGGYLPLW (SEQ ID NO: 52), or IAYMTLTLH (SEQ ID NO: 53).

In one embodiment, the FOLR1 binding protein comprises amino acid motifs selected from EEKY (SEQ ID NO: 61), ELLWY (SEQ ID NO: 54), and LGGAVLKLQ (SEQ ID NO: 47); EEKY (SEQ ID NO: 61), KLLWY (SEQ ID NO: 55), and LGGAVLKLQ (SEQ ID NO: 47) or LGGAVLKLP (SEQ ID NO: 49) or LGDAVLKLQ (SEQ ID NO: 48); EERY (SEQ ID NO: 62), KLLWY (SEQ ID NO: 55), and LGGAVLKLQ (SEQ ID NO: 47) or LGDAVLKLQ (SEQ ID NO: 48); EEKY (SEQ ID NO: 61), KLLRY (SEQ ID NO: 56), and LGGAVLKLQ (SEQ ID NO: 47); RLYKE (SEQ ID NO: 74), YLYWD (SEQ ID NO: 57), and RFGDHLDLT (SEQ ID NO: 50) or RFGYHLDLT (SEQ ID NO: 51); RLYKE (SEQ ID NO: 74), YLYGD (SEQ ID NO: 58), and RFGYHLDLT (SEQ ID NO: 51); ESYKW (SEQ ID NO: 75), QLVWD (SEQ ID NO: 59), and DLGGYLPLW (SEQ ID NO: 52); or YNIKD (SEQ ID NO: 76), MLFWS (SEQ ID NO: 60), and IAYMTLTLH (SEQ ID NO: 53) in positions corresponding to positions 9-12, 42-46, and 62-70 of ubiquitin as defined in SEQ ID NO: 46, as shown in Table 1.

TABLE 1

Amino acids of FOLR1 binding proteins in selected positions
The numbers in the top row refer to the corresponding position in SEQ ID NO: 46.

| SEQ ID NO | 9 | 10 | 11 | 12 | 42 | 43 | 44 | 45 | 46 | 62 | 63 | 64 | 65 | 66 | 67 | 68 | 69 | 70 |
|---|---|---|---|---|---|---|---|---|---|---|---|---|---|---|---|---|---|---|
| 1 | E | E | K | Y | E | L | L | W | Y | L | G | G | A | V | L | K | L | Q |
| 2, 30, 31 | E | E | K | Y | E | L | L | W | Y | L | G | G | A | V | L | K | L | Q |

TABLE 1-continued

Amino acids of FOLR1 binding proteins in selected positions. The numbers in the top row refer to the corresponding position in SEQ ID NO: 46.

| SEQ ID NO | 9 | 10 | 11 | 12 | 42 | 43 | 44 | 45 | 46 | 62 | 63 | 64 | 65 | 66 | 67 | 68 | 69 | 70 |
|---|---|---|---|---|---|---|---|---|---|---|---|---|---|---|---|---|---|---|
| 3 | E | E | K | Y | E | L | L | W | Y | L | G | G | A | V | L | K | L | Q |
| 4, 32, 33 | E | E | K | Y | K | L | L | W | Y | L | G | G | A | V | L | K | L | Q |
| 5, 34, 35 | E | E | K | Y | K | L | L | W | Y | L | G | G | A | V | L | K | L | Q |
| 6, 36, 37 | E | E | K | Y | K | L | L | W | Y | L | G | G | A | V | L | K | L | Q |
| 7 | E | E | K | Y | K | L | L | W | Y | L | G | G | A | V | L | K | L | Q |
| 12 | E | E | K | Y | K | L | L | W | Y | L | G | G | A | V | L | K | L | Q |
| 14 | E | E | K | Y | K | L | L | W | Y | L | G | G | A | V | L | K | L | Q |
| 15 | E | E | K | Y | K | L | L | W | Y | L | G | G | A | V | L | K | L | Q |
| 16 | E | E | K | Y | K | L | L | W | Y | L | G | G | A | V | L | K | L | Q |
| 23 | E | E | K | Y | K | L | L | W | Y | L | G | G | A | V | L | K | L | Q |
| 17 | E | E | K | Y | K | L | L | W | Y | L | G | D | A | V | L | K | L | Q |
| 11 | E | E | K | Y | K | L | L | R | Y | L | G | G | A | V | L | K | L | Q |
| 19 | E | E | K | Y | K | L | L | W | Y | L | G | G | A | V | L | K | L | P |
| 21 | E | E | K | Y | K | L | L | W | Y | L | G | G | A | V | L | K | L | P |
| 22 | E | E | K | Y | K | L | L | W | Y | L | G | G | A | V | L | K | L | P |
| 8 | E | E | R | Y | K | L | L | W | Y | L | G | G | A | V | L | K | L | Q |
| 9 | E | E | R | Y | K | L | L | W | Y | L | G | G | A | V | L | K | L | Q |
| 18, 38-41 | E | E | R | Y | K | L | L | W | Y | L | G | D | A | V | L | K | L | Q |
| 69 | E | Q | K | Y | K | L | L | W | Y | L | G | G | A | V | L | K | L | Q |
| 70 | E | Q | K | Y | K | L | L | W | Y | L | G | G | A | V | L | K | L | Q |
| 71, 72, 73 | E | Q | K | Y | K | L | L | W | Y | L | G | G | A | V | L | K | L | P |
| 10 | E | E | K | Y | K | L | L | W | Y | L | G | G | A | V | L | K | L | Q |
| 13 | E | E | K | Y | K | L | L | W | Y | L | G | G | A | V | L | K | L | Q |
| 20, 42, 43 | E | E | K | Y | K | L | L | W | Y | L | G | G | A | V | L | K | L | P |
| 24 | L | Y | K | E | Y | L | Y | W | D | R | F | G | D | H | L | D | L | T |
| 25 | L | Y | K | E | Y | L | Y | G | D | R | F | G | D | H | L | D | L | T |
| 26 | L | Y | K | E | Y | L | Y | W | D | R | F | G | Y | H | L | D | L | T |
| 27 | L | Y | K | E | Y | L | Y | W | D | R | F | G | Y | H | L | D | L | T |

TABLE 1-continued

Amino acids of FOLR1 binding proteins in selected positions
The numbers in the top row refer to the corresponding position in SEQ ID NO: 46.

| SEQ ID NO | 9 | 10 | 11 | 12 | 42 | 43 | 44 | 45 | 46 | 62 | 63 | 64 | 65 | 66 | 67 | 68 | 69 | 70 |
|---|---|---|---|---|---|---|---|---|---|---|---|---|---|---|---|---|---|---|
| 28 | S | Y | K | W | Q | L | V | W | D | D | L | G | G | Y | L | P | L | W |
| 29 | N | I | K | D | M | L | F | W | S | I | A | Y | M | T | L | T | L | H |

In one embodiment, the FOLR1 binding protein comprises further substitutions in 1, 2, 3, 4, 5 amino acid positions, selected from positions corresponding to positions 6, 8, 13, 14, 20, 23, 24, 25, 29, 30, 31, 32, 33, 34, 48, 49, 51, 52, 58, 59, 60, 71, and 72 of SEQ ID NO: 46. In some embodiments, the substitutions are selected from any one of the group of K6V, K6Q, L8R, L8E, L8Y, I13T, T14A, T14P, S20C, S20G, I23T, I23V, E24G, E24A, N25D, K29R, K29E, K29T, I30V, I30L, Q31R, D32G, D32N, K33R, K33Q, E34A, K48E, Q49R, E51K, E51D, D52G, D58N, Y59H, N60T, N60S, L71P, R72G, R72Y, and R72K, preferably wherein the FOLR1 binding protein comprises an amino acid with sequence identity between 70% and 85% to SEQ ID NO: 46, preferably between 75% and 83% to SEQ ID NO: 46, preferably between 76% and 83% to SEQ ID NO: 46. In some embodiments, further substitutions are selected from Y59H (for example, see SEQ ID NO: 7). In some embodiments, further substitutions are selected from E24A (for example, see SEQ ID NO: 1; 81.6% sequence identity to SEQ ID: 46; 14 amino acids modified out of 76 amino acids). In some embodiments, further substitutions are selected from any one of the group of K29R and K48E (for example, see SEQ ID NO: 4; 80.3% sequence identity to SEQ ID: 46; 15 amino acids modified out of 76 amino acids). In some embodiments, further substitutions are selected from any one of the group of T14A, I30V, and K48E (for example, see SEQ ID NO: 2)(78.9% sequence identity to SEQ ID: 46; 16 amino acids modified; see for example the dimer of SEQ ID NO: 2 as shown in SEQ ID NO: 30), In some embodiments, further substitutions are selected from any one of the group of K6V, L8R, and R72G (for example, see SEQ ID NO: 24; 78.9% sequence identity to SEQ ID: 46; 16 amino acids modified). In some embodiments, further substitutions are selected from any one of the group of K6V, L8R, W45G, R72G (for example, see SEQ ID NO: 25; 77.6% sequence identity to SEQ ID: 46; 17 amino acids modified). In some embodiments, further substitutions are selected from any one of the group of K6V, L8R, I13T, T14A, R72G (for example, see SEQ ID NO: 27; 76.3% sequence identity to SEQ ID: 46; 18 amino acids modified).

Additional examples are provided in FIG. 1.

Structural characterization by positions in SEQ ID NO: 46 that are not substituted. In various embodiments, the FOLR1 binding protein as disclosed herein is further structurally characterized in that certain residues are not subject to mutation, for example, the amino acid residues corresponding to positions 1, 2, 3, 4, 5, 7, 15, 16, 17, 18, 19, 21, 22, 26, 27, 28, 35, 36, 37, 38, 39, 40, 41, 43, 47, 50, 53, 54, 55, 56, 57, 61, 67, 69, 73, 74, 75, 76 of SEQ ID NO: 46 (ubiquitin). Thus, in various embodiments, the amino acid residues at positions 1-5, 7, 15-19, 21, 22, 26-28, 35-41, 43, 47, 50, 53-57, 61, 67, 69, 71, 73-76 correspond to the amino acid as shown in SEQ ID NO: 46.

Multimers. In preferred embodiments, the FOLR1 binding protein is a multimer comprising of a plurality of the FOLR1 binding protein as defined herein. A multimer may comprise two, three, four, or more FOLR1 binding proteins. In one embodiment, the FOLR1 binding protein comprises 2, 3, 4, or more FOLR1 binding proteins linked to each other, i.e. the FOLR1-binding protein can be a dimer, trimer, or tetramer, etc. In some embodiments, the multimer is a dimer of the FOLR1 binding protein as defined above. In various embodiments, the FOLR1 binding protein is a homo-dimer. Homo-dimeric FOLR1 binding proteins are proteins wherein two FOLR1 binding proteins with identical amino acid sequences are linked to each other. Homo-dimers can be generated by fusing two identical proteins of any one of the group of SEQ ID NO: 1-29 or of any of the amino acid sequences with at least 90% identity thereto. For example, the FOLR1 binding protein of SEQ ID NO: 33 is a homo-dimer of two identical amino acid sequences of SEQ ID NO: 4. Selected examples for homo-dimers are shown in SEQ ID NOs: 30-43 and in Table 2.

TABLE 2

Homo-dimeric FOLR1 binding proteins

| SEQ ID NO: | Affilin | Dimer of Affilin | Linker (amino acids) |
|---|---|---|---|
| 31 | 199489 | 197556b (SED ID NO: 2) | 0 |
| 30 | 199490 | 197556b (SED ID NO: 2) | 16 |
| 33 | 199483 | 196962 (SED ID NO: 4) | 0 |
| 32 | 199484 | 196962 (SED ID NO: 4) | 16 |
| 35 | 199487 | 197525 (SED ID NO: 5) | 0 |
| 34 | 199488 | 197525 (SED ID NO: 5) | 16 |
| 37 | 199477 | 187731 (SEQ ID NO: 6) | 0 |
| 36 | 199478 | 187731 (SEQ ID NO: 6) | 16 |
| 43 | 199485 | 197014 (SED ID NO: 20) | 0 |
| 42 | 199486 | 197014 (SED ID NO: 20) | 16 |
| 38 | 199479 | 196934 (SED ID NO: 18) | 0 |
| 39 | 199480 | 196934 (SED ID NO: 18) | 10 |
| 40 | 199481 | 196934 (SED ID NO: 18) | 16 |
| 41 | 199482 | 196934 (SED ID NO: 18) | 20 |

In other embodiments the multimer is a hetero-dimer, e.g. the two amino acid sequences of the FOLR1 specific Affilin proteins have different amino acid sequences.

In some embodiments, two or more FOLR1 binding proteins are directly linked. In some embodiments, two or more FOLR1 binding proteins are linked by a peptide linker. In various embodiments, two or more FOLR1 binding proteins are linked via a peptide linker of up to 30 amino acids. In other embodiments, two or more FOLR1 binding proteins are linked via a peptide linker of 10, 11, 12, 13, 14, 15, 16, 17, 18, 19, 20 amino acids. In one embodiment, two FOLR1 binding proteins are linked by 16 amino acids, preferably, two identical FOLR1 binding proteins are linked by 16 amino acids.

One embodiment relates to a linker that is comprised of amino acids such as glycine, serine, alanine, or proline. A linker may consist of glycine and serine and may be glycine-rich (e.g., more than 50% of the residues in the linker can be glycine residues). In some embodiments two or more FOLR1 binding proteins are linked via a peptide linker of the amino acid sequence according to any one of SEQ ID NO: 67 or peptide linkers with 90% identity thereto. Other linkers for the fusion of proteins are known in the art and can be used.

The FOLR1 binding protein as described herein comprises, essentially consists, or consists of an amino acid sequence selected from the group of SEQ ID NOs: 1-45 and SEQ ID Nos: 69-74 or selected from amino acid sequences with at least 90% identity thereto, respectively. In some embodiments, a FOLR1 binding protein comprises an amino acid sequence that exhibit at least 90% identity to the amino acid sequence of SEQ ID NO: 2 (Affilin-197556b). For example, SEQ ID NOs: 1-23 and SEQ ID NOs: 30-43 and SEQ ID Nos: 69-74 comprise amino acid sequences that exhibit at least 90% identity to the amino acid sequence of SEQ ID NO: 2. In some embodiments, a FOLR1 binding protein comprises an amino acid sequence that exhibit at least 90% identity to the amino acid sequence of SEQ ID NO: 24 (Affilin-189864). For example, SEQ ID NOs: 25-27 are at least 90% identical to SEQ ID NO: 2. In some further embodiments, a FOLR1 binding protein comprises an amino acid sequence that exhibit at least 90% identity to the amino acid sequence of SEQ ID NO: 29 (Affilin-187803) or to SEQ ID NO: 28 (Affilin-187770). For example, but not limited to, selected FOLR1 binding proteins are shown in FIG. 1.

Functional characterization. In some embodiments, the FOLR1 binding protein as described herein binds to FOLR1 expressed on cells as determined by FACS and/or has a binding affinity to FOLR1 of 500 nM or less as determined by surface plasmon resonance assays.

In some embodiments, the FOLR1 binding protein as described herein has a binding affinity ($K_D$) of less than 500 nM for FOLR1. The FOLR1 binding proteins bind FOLR1 with measurable binding affinity of less than 500 nM, less than 200 nM, less than 100 nM, less than 50 nM, less than 20 nM, less than 10 nM, less than 5 nM and more preferred less than 1 nM. The appropriate methods are known to those skilled in the art or described in the literature. The methods for determining the binding affinities are known per se and can be selected for instance from the following methods known in the art: enzyme-linked immunosorbent assay (ELISA), surface plasmon resonance (SPR), kinetic exclusion analysis (KinExA assay), Bio-layer interferometry (BLI), flow cytometry, fluorescence spectroscopy techniques, isothermal titration calorimetry (ITC), analytical ultracentrifugation, radioimmunoassay (RIA or IRMA), and enhanced chemiluminescence (ECL). Some of the methods are described in the Examples below. Typically, the dissociation constant $K_D$ is determined at 20° C., 25° C., or 30° C. If not specifically indicated otherwise, the $K_D$ values recited herein are determined at 25° C. by SPR. The lower the $K_D$ value, the greater the binding affinity of the biomolecule for its binding partner. The higher the $K_D$ value, the more weakly the binding partners bind to each other. Examples of binding affinities FOLR1 binding proteins to FOLR1 are provided in Table 4 (see Example 5).

In some embodiments, the FOLR1 binding protein as described herein has a specific binding affinity ($K_D$) of less than 500 nM for FOLR1 but not for FOLR2. In some embodiments, the FOLR1 (folate receptor alpha) binding protein as described herein binds specifically to FOLR1 but does not detectably bind to FOLR2 (folate receptor beta), as determined by surface plasmon resonance assays (see FIG. 3) and as tested on FOLR2 expressing cell lines and as described further in the Examples (see Example 6). Thus, the binding of the FOLR1 binding protein as described herein is highly specific. FOLR1 and FOLR2 are folate receptor isoforms with low degree of homology (less than 80%) and different expression pattern. FOLR1 is mainly expressed on malignant cancer cells whereas FOLR2 is expressed on activated macrophages at sites of inflammation. A high selective binding to FOLR1 may be important for targeted medical applications for FOLR1 related cancer but not for inflammation, and may have reduced potential toxic side effects.

In some embodiments, the FOLR1 binding protein as described herein binds to FOLR1 but does not detectably bind to human Fc-domain of immunoglobulin $IgG_1$, as determined by surface plasmon resonance assays.

The half maximal effective concentration $EC_{50}$ refers to the concentration of a FOLR1 binding protein which induces a response halfway between the baseline and maximum after a specified exposure time and thus represents the concentration of a FOLR1 binding protein where 50% of its maximal effect is observed, in this case half-maximal fluorescence intensity signal in a cell binding, flow cytometry experiment. In some embodiments, the FOLR1 binding protein as described herein has an $EC_{50}$ of less than 100 nM for FOLR1 expressing cells, less than 50 nM, less than 20 nM, less than 10 nM, less than 5 nM and more preferred less than 1 nM. In some embodiments, the FOLR1 binding protein as described herein has an $EC_{50}$ to FOLR1 of less than 1 nM after incubation in the presence of mouse serum for at least 24 h at 37° C. The appropriate methods are known to those skilled in the art. The lower the $EC_{50}$ value, the greater the binding of the FOLR1 binding protein for FOLR1. Examples for FOLR1 binding proteins that are stable even in the presence of serum are provided in Table 5 (see Example 9) and Table 6 (see Example 10).

In some embodiments, the FOLR1 binding protein as described herein is stable at high temperatures, preferably between 62° C. to 87° C. For stability analysis, for example spectroscopic or fluorescence-based methods in connection with chemical or physical unfolding are known to those skilled in the art. For example, the stability of a molecule can be determined by measuring the thermal melting ($T_m$) temperature, the temperature in ° Celsius (° C.) at which half of the molecules become unfolded, using standard methods. Typically, the higher the $T_m$, the more stable the molecule. Temperature stability was determined by differential scanning fluorimetry (DSF), as described in further detail in Example 4 and in Table 3.

Coupling sites. In some embodiments, the FOLR1 binding protein as described herein further comprises one or more coupling site(s) for the coupling of chemical moieties. A coupling site is capable of reacting with other chemical groups to couple the FOLR1 binding protein to chemical moieties. The defined number and defined position of coupling sites enables site-specific coupling of chemical moieties to the FOLR1 binding proteins as described herein. Thus, a large number of chemical moieties can be bound to a FOLR1 binding protein if required. The number of coupling sites can be adjusted to the optimal number for a certain application by a person skilled in the art to adjust the amount of the chemical moieties accordingly. In selected embodiments, the coupling site may be selected from the group of one or more amino acids which can be labeled with specific chemistry such as one or more cysteine residues, one or more lysine residues, one or more tyrosine residues, one or more tryptophan residues, or one or more histidine residues. The FOLR1 binding protein may comprise 1 to 20 coupling site(s), preferably 1 to 6 coupling site(s), preferably 2 coupling sites, or preferably one coupling site.

Coupling domains. One embodiment provides a FOLR1 binding protein that comprises at least one coupling domain of 1 to 80 amino acids comprising one or more coupling sites. In some embodiments, the coupling domain of 1 to 80 amino acids may comprise alanine, proline, or serine, and as coupling site cysteine. Examples for FOLR1 binding proteins with coupling domain are provided in SEQ ID NOs: 44 and 45 (coupling domain of 3 amino acids "SAC", coupling site is cysteine). In other embodiments, the coupling domain of 5 to 80 amino acids may consist of alanine, proline, serine, and as coupling site cysteine. In one embodiment, the coupling domain is consisting of 20-60% alanine, 20-40% proline, 10-60% serine, and one or more cysteine as coupling site(s) at the C- or N-terminal end of the FOLR1 binding protein as described herein.

In some embodiments the amino acids alanine, proline, and serine are randomly distributed throughout a coupling domain amino acid sequence so that not more than a maximum of 2, 3, 4, or 5 identical amino acid residues are adjacent, preferably a maximum of 3 amino acids. The composition of the 1 to 20 coupling domains can be different or identical.

In some embodiments, the chemical moieties are selected from any of chelators, drugs, toxins, dyes, and small molecules. In some embodiments, at least one of the chemical moieties is a chelator designed as a complexing agent for coupling one or more further moieties to the targeted compound to the FOLR1 binding protein as disclosed herein. One embodiment relates to a FOLR1 binding protein wherein the chelator is a complexing agent for coupling one or more radioisotopes or other detectable labels, as described in the Examples (Examples 7-10).

Diagnostic moiety. In various embodiments, the FOLR1 binding protein further comprises a diagnostic moiety. In other embodiments, the FOLR1 binding protein further comprises more than one diagnostic moiety. In some embodiments, such diagnostic moiety may be selected from radionuclides, fluorescent proteins, photosensitizers, dyes, or enzymes, or any combination of the above. In some embodiments, a FOLR1 binding protein that comprises at least one diagnostic moiety can be employed, for example, as imaging agents, for example to evaluate presence of tumor cells or metastases, tumor distribution, and/or recurrence of tumor. Methods for detection or monitoring of cancer cells involve imaging methods. Such methods involve imaging FOLR1 related cancer cells by, for example, radioimaging or photoluminescens or fluorescence.

Therapeutic moiety. In various embodiments, the FOLR1 binding protein further comprises a therapeutically active moiety. In other embodiments, the FOLR1 binding protein further comprises more than one therapeutically active moiety. In some embodiments, such therapeutically active moiety may be selected from a monoclonal antibody or a fragment thereof, an extracellular domain of a receptor or fragments thereof, a radionuclide, a cytotoxic compound, a cytokine, a chemokine, an enzyme, or derivatives thereof, or any combination of the above. In some embodiments, the FOLR1 binding protein that comprises a therapeutically active component may be used in targeted delivery of any of the above listed components to the FOLR1 expressing tumor cell and accumulate therein, thereby resulting in low levels of toxicity to normal cells.

Radionuclides. Suitable radionuclides for applications in imaging in vivo or in vitro or for radiotherapy include for example but are not limited to the group of gamma-emitting isotopes, the group of positron emitters, the group of beta-emitters, and the group of alpha-emitters. In some embodiments, suitable conjugation partners include chelators such as 1,4,7,10-tetraazacyclododecane-1,4,7,10-tetraacetic acid (DOTA) or diethylene triamine pentaacetic acid (DTPA) or their activated derivatives, nanoparticles and liposomes. In various embodiments, DOTA may be suitable as complexing agent for radioisotopes and other agents for imaging, as described in the Examples in further detail.

Moiety modulating pharmacokinetics. In some embodiments, the FOLR1 binding protein further comprises at least one moiety modulating pharmacokinetics optionally selected from a polyethylene glycol, a human serum albumin, an albumin-binding peptide, an immunoglobulin binding peptide or an immunoglobulin or immunoglobulin fragments, or a polysaccharide (for example, hydroxylethyl starch), or an unstructured amino acid sequence which increases the hydrodynamic radius such as a multimer comprising amino acids alanine, glycine, serine, proline.

In various embodiments, said moiety increases the half-life of the FOLR1 binding protein at least 1.5 fold. Several techniques for producing FOLR1 binding protein with extended half-life are known in the art, for example, direct fusions of the moiety modulating pharmacokinetics with the FOLR1 binding protein as described above or chemical coupling methods. The moiety modulating pharmacokinetics can be attached for example at one or several sites of the FOLR1 binding protein through a peptide linker sequence or through a coupling site as described above.

Conjugation of proteinaceous or non-proteinaceous moieties to the FOLR1 binding protein may be performed applying chemical methods well-known in the art. In some embodiments, coupling chemistry specific for derivatization of cysteine or lysine residues may be applicable. Chemical coupling can be performed by chemistry well known to someone skilled in the art, including but not limited to, substitution, addition or cycloaddition or oxidation chemistry (e.g. disulfide formation).

Molecules for purification/detection. In some embodiments, additional amino acids can extend either at the N-terminal end of the FOLR1 binding protein or the C-terminal end or both. Additional sequences may include for example sequences introduced e.g. for purification or detection. In one embodiment, additional amino acid sequences include one or more peptide sequences that confer an affinity to certain chromatography column materials. Typical examples for such sequences include, without being limiting, Strep-tags, oligohistidine-tags, glutathione S-transferase, maltose-binding protein, inteins, intein fragments, or the albumin-binding domain of protein G. An example for a FOLR1 binding protein with Strep-tag is provided in SEQ ID NO: 45.

Use in medicine. Various embodiments relate to the FOLR1 binding protein as disclosed herein for use in medicine. In one embodiment, the FOLR1 binding protein is used in medicine to diagnose or treat cancer associated with FOLR1 expression. The FOLR1 binding proteins as disclosed herein allow selective diagnosis and treatment of FOLR1 related cancer cells or cancer tissues. FOLR1 is known to be upregulated in tumor cells, possibly resulting in uncontrolled growth of tumor cells and in the formation of metastases. Examples for FOLR1 related tumors are ovarian, endometrial, brain, lung, renal, head and neck, breast, stomach, and colon-rectum cancer.

One embodiment is a method of diagnosing (including monitoring) a subject having FOLR1 related cancer, the method of diagnosis (monitoring) comprising administering to the subject the FOLR1 binding protein as described, optionally conjugated to radioactive molecules. In various embodiments, the FOLR1 binding protein as disclosed herein may be used for diagnosis of FOLR1 related cancer, optionally wherein the FOLR1 binding protein is conjugated to a radioactive molecule. In some embodiments, the FOLR1 binding protein as disclosed herein may be used as biomarker. In some embodiments, imaging methods using the FOLR1 binding protein with labels such as radioactive or fluorescent can be employed to visualize FOLR1 on specific tissues or cells, for example, to evaluate presence of FOLR1 related tumor cells, FOLR1 related tumor distribution, recurrence of FOLR1 related tumor, and/or to evaluate the response of a patient to a therapeutic treatment.

One embodiment is a method of treating a subject having FOLR1 related cancer, the method of treatment comprising administering to the subject the FOLR1 specific binding protein as described, optionally conjugated to a radioactive molecule and/or a cytotoxic agent. In various embodiments, the FOLR1 binding protein as disclosed herein may be used for treatment of FOLR1 related cancer, optionally wherein the FOLR1 binding protein is conjugated to a cytotoxic agent and/or to a radioactive molecule and/or expressed on the surface of target specific CarT cells. Some embodiments relate to the use of the FOLR1 binding protein labelled with a suitable radioisotope or cytotoxic compound or treatment of FOLR1 related tumor cells, in particular to control or kill FOLR1 related tumor cells, for example malignant cells. In one embodiment, curative doses of radiation are selectively delivered of to FOLR1 related tumor cells but not to normal cells.

The FOLR1 specific binding proteins as disclosed herein may be used for tumor-targeted therapy or diagnosis without recognizing inflammed tissues. Due to the specific binding to FOLR1 (and not to FOLR2), a FOLR1 tumor-targeted therapy for example in autoimmune patients or patients having an inflammation might be beneficial.

Compositions. Various embodiments relate to a composition comprising the FOLR1 binding protein as disclosed herein. A composition comprising the FOLR1 binding protein as defined above for use in medicine, preferably for use in the diagnosis or treatment of various FOLR1 related cancer tumors, such as ovarian, endometrial, brain, lung, renal, head and neck, breast, stomach, colon-rectum cancer, etc, preferably ovarian, breast, and lung cancer. Compositions comprising the FOLR1 binding protein as described above may be used for clinical applications for both diagnostic and therapeutic purposes. In particular, compositions comprising the FOLR1 binding protein as described above may be used for clinical applications for imaging, monitoring, and eliminating or inactivating pathological cells that express FOLR1.

Various embodiments relate to a diagnostic composition for the diagnosis of FOLR1 related cancer comprising the FOLR1 binding protein as defined herein and a diagnostically acceptable carrier and/or diluent. These include for example but are not limited to stabilizing agents, surface-active agents, salts, buffers, coloring agents etc. The compositions can be in the form of a liquid preparation, a lyophilisate, granules, in the form of an emulsion or a liposomal preparation.

The diagnostic composition comprising the FOLR1 binding protein as described herein can be used for diagnosis of FOLR1 related cancer, as described above.

Various embodiments relate to a pharmaceutical (e.g. therapeutical) composition for the treatment of diseases comprising the FOLR1 binding protein as disclosed herein, and a pharmaceutically (e.g. therapeutically) acceptable carrier and/or diluent. The pharmaceutical (e.g. therapeutical) composition optionally may contain further auxiliary agents and excipients known per se. These include for example but are not limited to stabilizing agents, surface-active agents, salts, buffers, coloring agents etc.

The pharmaceutical composition comprising the FOLR1 binding protein as defined herein can be used for treatment of diseases, as described above.

The compositions contain an effective dose of the FOLR1 binding protein as defined herein. The amount of protein to be administered depends on the organism, the type of disease, the age and weight of the patient and further factors known per se. Depending on the galenic preparation these compositions can be administered parentally by injection or infusion, systemically, intraperitoneally, intramuscularly, subcutaneously, transdermally, or by other conventionally employed methods of application.

The composition can be in the form of a liquid preparation, a lyophilisate, a cream, a lotion for topical application, an aerosol, in the form of powders, granules, in the form of an emulsion or a liposomal preparation. The type of preparation depends on the type of disease, the route of administration, the severity of the disease, the patient and other factors known to those skilled in the art of medicine.

The various components of the composition may be packaged as a kit with instructions for use.

Preparation of FOLR1 binding proteins. FOLR1 binding proteins as described herein may be prepared by any of the many conventional and well known techniques such as plain organic synthetic strategies, solid phase-assisted synthesis techniques, fragment ligation techniques or by commercially available automated synthesizers. On the other hand, they may also be prepared by conventional recombinant techniques alone or in combination with conventional synthetic techniques. Furthermore, they may also be prepared by cell-free in vitro transcription/translation.

Various embodiments relate to a polynucleotide encoding a FOLR1 binding protein as disclosed herein. One embodiment further provides an expression vector comprising said polynucleotide, and a host cell comprising said isolated polynucleotide or the expression vector.

Various embodiments relate to a method for the production of a FOLR1 binding protein as disclosed herein comprising culturing of a host cell under suitable conditions which allow expression of said FOLR1 binding protein and optionally isolating said FOLR1 binding protein.

For example, one or more polynucleotides which encode for the FOLR1 binding protein may be expressed in a suitable host and the produced FOLR1 binding protein can be isolated. A host cell comprises said nucleic acid molecule or vector. Suitable host cells include prokaryotes or eukaryotes. A vector means any molecule or entity (e.g., nucleic acid, plasmid, bacteriophage or virus) that can be used to transfer protein coding information into a host cell. Various cell culture systems, for example but not limited to mammalian, yeast, plant, or insect, can also be employed to express recombinant proteins. Suitable conditions for culturing prokaryotic or eukaryotic host cells are well known to the person skilled in the art. Cultivation of cells and protein expression for the purpose of protein production can be performed at any scale, starting from small volume shaker flasks to large fermenters, applying technologies well-known to any skilled in the art.

One embodiment is directed to a method for the preparation of a binding protein as detailed above, said method comprising the following steps: (a) preparing a nucleic acid encoding a FOLR1 binding protein as defined herein; (b) introducing said nucleic acid into an expression vector; (c) introducing said expression vector into a host cell; (d) cultivating the host cell; (e) subjecting the host cell to culturing conditions under which a FOLR1 binding protein is expressed, thereby producing a FOLR1 binding protein as defined herein; (f) optionally isolating the FOLR1 binding protein produced in step (e); and (g) optionally conjugating the FOLR1 binding protein with further functional moieties as defined herein.

In general, isolation of purified FOLR1 binding protein from the cultivation mixture can be performed applying conventional methods and technologies well known in the art, such as centrifugation, precipitation, flocculation, different embodiments of chromatography, filtration, dialysis, concentration and combinations thereof, and others. Chromatographic methods are well-known in the art and comprise without limitation ion exchange chromatography, gel filtration chromatography (size exclusion chromatography), hydrophobic interaction chromatography or affinity chromatography.

For simplified purification, the FOLR1 binding protein can be fused to other peptide sequences having an increased affinity to separation materials. Preferably, such fusions are selected that do not have a detrimental effect on the functionality of the FOLR1 binding protein or can be separated after the purification due to the introduction of specific protease cleavage sites. Such methods are also known to those skilled in the art.

EXAMPLES

The following Examples are provided for further illustration of the invention. The invention is particularly exemplified by particular modifications of ubiquitin (SEQ ID NO: 46) resulting in binding to FOLR1. The invention, however, is not limited thereto, and the following Examples merely show the practicability of the invention on the basis of the above description.

Example 1. Identification of FOLR1 Binding Proteins

Library Construction and Cloning of Libraries.

Libraries comprising randomized amino acid positions were in house synthesized by randomized oligonucleotides generated by synthetic trinucleotide phosphoramidites (ELLA Biotech) to achieve a well-balanced amino acid distribution with simultaneously exclusion of cysteine and other amino acid residues at randomized positions.

```
Sequence of ubiquitin (SEQ ID NO: 46):
MQIFVKTLTGKTITLEVEPSDTIENVKAKIQDKEGIPPDQQRLIFAGK

QLEDGRTLSDYNIQKESTLHLVLRLRAA
```

SEQ ID NO: 46 was randomized in amino acid positions 6, 8, 9, 10, 12, 42, 44, 46, 62, 63, 64, 65, 66, 68, 70, 72. The corresponding cDNA library was amplified by PCR and ligated with a modified pCD87SA phagemid (herein referred to as pCD12) using standard methods known to a skilled person. The pCD12 phagemid comprises a modified torA leader sequence (deletion of amino acid sequence QPAMA) to achieve protein processing without additional amino acids at the N terminus. Aliquots of the ligation mixture were used for electroporation of *E. coli* ER2738 (Lucigen). Unless otherwise indicated, established recombinant genetic methods were used.

Example 2. Identification of FOLR1 Binding Proteins

Target. A DNA sequence encoding the human FOLR1 (uniprot Accession Number P15328; residues 25-234) was genetically fused either with the Fc-fragment of human IgG1 followed by a His-tag at the C-terminus or an Avi-tag followed by a His-tag at the C-terminus. Full length cDNA with human codon usage was provided by OriGene Technologies, cloned into the mammalian expression vector pCEP4 and expressed in mammalian Expi293F cells at different scales ranging from 400 ml up to 2 l in shaking flasks. Expression cultures with the pCEP4-FOLR1-Avi-His construct were additionally co-transfected with pCEP4-BirA to induce site-directed biotinylation of the target protein. Expression cultures were analyzed by SDS-PAGE and by immunoblot analysis with antibodies directed against FOLR1, the Fc-part of human IgG1 or biotin.

Cell culture supernatant of FOLR1-Fc-His expressions was centrifuged and filtrated for application to affinity chromatography on a HisTrap excel 1 mL column (GE Healthcare). The target protein was eluted by injection of imidazole containing buffer and applied to a Superdex 200 XK 16/600 gel filtration column. Cell culture supernatant of FOLR1-Avi-His expressions was centrifuged, filtrated and desalted for application to affinity chromatography on a Streptavidin Mutein Matrix (Roche). The target protein was eluted by injection of biotin containing buffer and applied to a Superdex 200 10/300 gel filtration column. The purity of the recovered target protein was analyzed and confirmed by SDS-PAGE and SE-HPLC. The biologic activity of the target protein towards the substrate folic acid was confirmed by concentration-dependent ELISA.

Primary selection by TAT Phage Display. The naive library was enriched against the FOLR1 using phage display as selection system. After transformation of competent bacterial ER2738 cells (Lucigene) with phagemid pCD12 carrying the library, phage amplification and purification was carried out using standard methods known to a skilled person. For selection the target protein was immobilized to magnetic beads. Target protein fused to IgG1-Fc was thereby immobilized to Protein A or Protein G Dynabeads®. Site-directed biotinylated target protein fused to Avi-tag or target protein fused to IgG1-Fc, which was additionally randomly biotinylated were immobilized on Streptavidin or Neutravidin SpeedBeads™. The FOLR1 concentration during phage incubation was lowered from 200 nM (first round) to 100 nM (second round) to 50 nM (third round), and 25 nM (fourth round). In the first selection a preselection with biotinylated Fc-fragment of IgG1 was performed, starting in round two. In the second selection a preincubation of the phage particles with mouse serum during the last three rounds for 3 h in round two and 23 h in round three and four, respectively as well as a preselection with biotinylated Fc-fragment of IgG1 was performed. FOLR1 phage complexes were magnetically separated from supernatant and washed several times. FOLR1 bound phages were eluted by trypsin. To identify target specific phage pools, eluted and reamplified phages of each selection round were analysed by phage pool ELISA. Wells of a medium binding microtiter plate (Greiner Bio-One) were coated with FOLR1 (2.5 µg/ml). Bound phages were detected using α-M13 HRP-conjugated antibody (GE Healthcare).

Cloning of target binding phage pools into an expression vector. Selection pools showing specific binding to FOLR1 in phage pool ELISA were amplified by PCR according to methods known in the art, cut with appropriate restriction nucleases and ligated into a derivative of the expression vector pET-28a (Merck, Germany) comprising a Strep-Tag II (IBA GmbH).

Single colony hit analysis. After transformation of BL21 (DE3) cells (Merck, Germany) kanamycin-resistant single colonies were grown. Expression of the FOLR1-binding proteins was achieved by cultivation in 384 well plates (Greiner Bio-One) using auto induction medium (Studier, 2005, Protein Expr. Purif. 41(1):207-234). Cells were harvested and subsequently lysed chemically or enzymatically by BugBuster reagent (Novagen) and mechanically by freeze/thaw cycles, respectively. After centrifugation the resulting supernatants were screened by ELISA with immobilized target on High Bind 384 ELISA microtiter plates (Greiner Bio-One). Detection of protein bound to FOLR1 was achieved by Strep-Tactin® HRP Conjugate (IBA GmbH) in combination with TMB-Plus Substrate (Biotrend, Germany). The reaction was stopped by addition of 0.2 M $H_2SO_4$ solution and measured in a plate reader at 450 nm versus 620 nm.

Construction of maturation library. For the maturation of selected variants an error-prone PCR was carried out by use of the dNTP analoga dPTP and 8-oxo-dGTP (Jena Bioscience). The obtained cDNA of maturation libraries was ligated with pCD12 as described above and test transformations in E. coli SS320 were performed.

Maturation selection and analysis. For affinity maturation two rounds of panning were performed. First maturation selection was performed with randomly biotinylated target protein fused to IgG1-Fc at a concentration of 80 nM and 8 nM in round one and two, respectively. For both rounds a preincubation of the phage particles with mouse serum for 3 h and 23 h in round one and two, respectively as well as a preselection with biotinylated Fc-fragment of IgG1 was performed. The second maturation selection was performed with site-directed biotinylated target protein fused to Avi-tag at a concentration of 50 nM and 1 nM in round one and two, respectively. For both rounds a preincubation of the phage particles with mouse serum was performed for 23 h in round one and two. To analyse the matured and selected pools for specific target binding a phage pool ELISA was performed followed by cloning of positive pools into expression vector pET-28a and hit ELISA as described above.

Example 3. Expression and Purification of FOLR1 Binding Proteins

FOLR1 binding proteins were cloned into an expression vector using standard methods known to a skilled person, purified and analyzed as described below. All FOLR1 specific proteins were expressed and highly purified by affinity chromatography and gel filtration. After affinity chromatography purification a size exclusion chromatography (SE HPLC or SEC) was performed using an Akta system and a Superdex™ 200 HiLoad 16/600 column (GE Healthcare). The column had a volume of 120 ml and was equilibrated with 2 CV. The samples were applied with a flow rate of 1 ml/min purification buffer. Fraction collection started as the signal intensity reached 10 mAU. Following SDS-PAGE analysis positive fractions were pooled and their protein concentrations were measured.

Further analysis included SDS-PAGE, SE-HPLC and RP-HPLC. Protein concentrations were determined by absorbance measurement at 280 nm using the molar absorbent coefficient. RP chromatography (RP HPLC) was performed using a Dionex HPLC system and a Vydac 214MS54 C4 (4.6×250 mm, 5 µm, 300 Å) column (GE Healthcare). For example, Affilin 202521 (SEQ ID NO: 30 with C-terminal coupling sequence "SAC") has a purity of about 100% according to SE-HPLC and RP-HLCP, respectively.

Example 4. FOLR1 Binding Proteins are Stable at High Temperatures

Thermal stability of the FOLR1 specific proteins was determined by Differential Scanning Fluorimetry (DSF). Each probe was transferred at concentrations of 0.1 µg/µL to a MicroAmp Optical 384-well plate, and SYPRO Orange dye was added at suitable dilution. A temperature ramp from 25 to 95° C. was programmed with a heating rate of 1° C. per minute (V2A-7 Applied Biosystems). Fluorescence was constantly measured at an excitation wavelength of 520 nm and the emission wavelength at 623 nm (V2A-7, Applied Biosystems). The midpoints of transition for the thermal unfolding (Tm, melting points) were determined and are shown in Table 3 for selected FOLR1 binding proteins.

TABLE 3

Temperature stability of FOLR1 binding proteins

| Affilin | SEQ ID | DSF in ° C. |
| --- | --- | --- |
| 197556a | 1 | 80 |
| 199490 | 30 | 85 |
| 199489 | 31 | 79 |
| 197251 | 3 | 80 |
| 199484 | 32 | 71 |
| 199483 | 33 | 62 |
| 197525 | 5 | 82 |
| 199487 | 35 | 64 |
| 199488 | 34 | 70 |
| 187731 | 6 | 87 |
| 199477 | 37 | 79 |
| 199478 | 36 | 85 |
| 197340 | 8 | 72 |
| 196920 | 9 | 73 |
| 196964 | 12 | 74 |
| 196868 | 14 | 79 |
| 197383 | 17 | 80 |
| 196934 | 18 | 81 |
| 199479 | 38 | 65 |
| 199480 | 39 | 70 |
| 199481 | 40 | 71 |
| 199482 | 41 | 72 |
| 197126 | 19 | 79 |
| 199485 | 43 | 76 |
| 199486 | 42 | 72 |
| 196888 | 21 | 76 |
| 181919 | 26 | 63 |
| 187803 | 29 | 62 |

Example 5. Analysis of FOLR1 Binding Proteins (Surface Plasmon Resonance, SPR)

A CM5 sensor chip (GE Healthcare) was equilibrated with SPR running buffer. Surface-exposed carboxylic groups were activated by passing a mixture of EDC and NHS to yield reactive ester groups. 700-1500 RU FOLR1 (on-ligand) were immobilized on a flow cell. A flow cell without ligand was used as reference. Injection of ethanolamine after ligand immobilization was used to block unreacted NHS groups. Upon ligand binding, protein analyte was accumulated on the surface increasing the refractive index. This change in the refractive index was measured in real time and plotted as response or resonance units (RU) versus time. The analytes were applied to the chip in serial dilutions with a flow rate of 30 µl/min. The association was performed for 30 seconds and the dissociation for 60 seconds. After each run, the chip surface was regenerated with 30 µl regeneration buffer and equilibrated with running buffer. The control samples were applied to the matrix with a flow rate of 30 µl/min, while they associate for 60 seconds and dissociate for 120 seconds. Regeneration and re-equilibration were performed as previously mentioned. Binding studies were carried out by the use of the Biacore 3000 (GE Healthcare); data evaluation was operated via the BIAevaluation 3.0 software, provided by the manufacturer, by the use of the Langmuir 1:1 model (RI=0).

FIG. 2, FIG. 3, and Table 4 shows the binding affinity of FOLR1 binding proteins to FOLR1-Fc.

TABLE 4

Binding affinity ($K_D$) of FOLR1 binding proteins to FOLR1-Fc as determined by SPR assay (Biacore).

| Affilin | SEQ ID | Biacore in M |
|---------|--------|--------------|
| 197556a | 1      | 4.11E−10     |
| 199490  | 30     | 1.19E−10     |
| 199489  | 31     | 2.06E−10     |
| 199487  | 35     | 1.51E−10     |
| 199488  | 34     | 8.49E−11     |
| 199477  | 37     | 1.87E−11     |
| 199478  | 36     | 2.07E−10     |
| 199479  | 38     | 4.74E−11     |
| 199480  | 39     | 3.09E−11     |
| 199481  | 40     | 3.12E−11     |
| 199482  | 41     | 2.61E−11     |
| 197126  | 19     | 2.15E−09     |
| 189864  | 24     | 2.91E−11     |
| 189872  | 25     | 4.17E−12     |
| 181919  | 26     | 1.68E−08     |
| 189853  | 27     | 7.42E−12     |
| 187803  | 29     | 3.88E−07     |

Example 6. Functional Characterization: Specific Binding to Cell Surface Expressed FOLR1 but not to FOLR2 (Flow Cytometry)

Flow cytometry was used to analyze the specific interaction of FOLR1 binding proteins with surface-exposed FOLR1 but not with FOLR2. Transfected HEK293-FOLR1-cells, HEK293-FOLR2-cells, and empty vector control HEK293-pEntry-cells were trypsinized and resuspended in medium containing FCS, washed and stained in pre-cooled FACS blocking buffer. A cell concentration of $1\times10^6$ cells/ml was prepared for cell staining and 100 µl/well were filled into a 96 well plate (Greiner) in triplicate for each cell line. 50 nM of Affilin proteins or monoclonal anti-human-FOLR1 antibody (clone LK 26; BioLegend, 908301) as positive control or anti-human-FOLR2 antibody (clone EM35; Sysmex, BD029864) were added to FOLR overexpressing and control cells. After 45 min the supernatants were removed, and 100 µl/well rabbit anti-Strep-Tag antibody (GenScript; A00626), 1:300 diluted in FACS blocking buffer, were added. Anti-FOLR1 antibody and anti-FOLR2 antibodies were detected with anti-mouse-IgG-Alexa 488 (Invitrogen; A-10680) with a dilution of 1:1000. After removal of the primary antibody, goat anti-rabbit IgG Alexa Fluor 488 antibody (Invitrogen; A11008) was applied in a 1:1000 dilution. Flow cytometry measurement was conducted on the Guava easyCyte 5HT device (Merck-Millipore) at excitation wavelength 488 nm and emission wavelength 520 nm.

All FOLR1 binding proteins showed specific binding on HEK293-FOLR1-overexpressing cells, but no binding on FOLR1-negative cell lines (for example, HEK293-pEntry). All FOLR1 binding proteins tested for binding to FOLR2 showed no binding to FOLR2. Controls: anti-FOLR1-antibody as positive control; ubiquitin as negative control (HEK293-FOLR1-cells).

Example 7: Labeling of Fusion Protein with DOTA

FOLR1 binding proteins were incubated with 20-fold excess of Maleimide-DOTA (2,2',2"-(10-(2-((2-(2,5-dioxo-2,5-dihydro-1H-pyrrol-1-yl)ethyl)amino)-2-oxoethyl)-1,4,7,10-tetraazacyclododecane-1,4,7-triyl)triacetic acid, Chematech) in 50 mM HEPES, 150 mM sodium chloride, 5 mM EDTA pH 7.0 for 3 h at room temperature. In order to reduce metal ions that might interact with DOTA-molecules all columns and ÄKTA devices (GE Healthcare) were incubated with 0.1 M EDTA solution for 30 minutes. For preparing solutions only metal-free or metal-reduced components were used. After incubation the samples were separated from unbound DOTA molecules via gelfiltration (Superdex S200, GE Healthcare) in 100 mM sodium acetate pH 5.0-5.8. Samples of proteins were also incubated with 5 mM iron(II)chloride for 1 h at room temperature to prove the availability of DOTA-molecules for coupling with radio isotopes. After the incubation unbound iron was removed using a HiTrap Desalting column (GE Healthcare). MALDI-TOF analysis was used to determine the degree of labeling. In further experiments, FOLR1 proteins were coupled with DOTA and labeled with $Lu^{3+}$. $Lu^{3+}$ loading was at c=0.2 mg/ml in 100 nM NaAcetate at pH 5.8 with labeling temperatures of up to 70° C. Molecules were analyzed by CD spectroscopy at 207 nm.

Example 8: Matrix-Assisted Laser Desorption/Ionization Mass Spectrometry (MALDI-TOF)

Matrix-assisted laser desorption/ionization mass spectrometry (MALDI-TOF MS) was carried out as followed: FOLR1 binding proteins were purified and concentrated using C18-P10-ZipTips (Millipore; catalog number ZTC18S096). The tips were washed with 0.1% (v/v) trifluoroacidic acid (TFA) in water and eluted with 50% (v/v) acetonitrile/0.1% TFA. Samples were treated with 2% (v/v) TFA in water and embedded in 2,5-dihydroxyacetophenone (DHAP) matrix (Bruker, catalog number 8231829). The mass of FOLR1 binding proteins was measured on an Autoflex™ speed mass spectrometer (Bruker). Protein calibration standards (Bruker, part no. 8206355 and part no. 8207234) were used for tuning of the autoflex speed mass spectrometer.

FOLR1 binding proteins with and without DOTA label were analyzed by MALDI-TOF mass spectra and peaks were compared. MALDI-TOF analysis showed that the DOTA molecules labeled to the FOLR1 binding proteins were available for coupling with iron(II)chloride molecules. Although the $K_D$ was slightly altered after labeling of the FOLR1 binding proteins, labeling did not significantly affect the affinity of the FOLR1 binding proteins to the target. Results are summarized in Table 5 and in Table 6.

Example 9. Serum Stability of FOLR1 Binding Proteins (Flow Cytometry)

The stability of FOLR1 binding proteins in the presence of serum was analyzed. Binding proteins were incubated with a dilution series from 1 µM (Affilin-199479, Affilin-199487, Affilin-197556a, Affilin-199488, Affilin-199488-Dota, Affilin-199490 and Affilin-199490-Dota) and 200 nM (Affilin-199489) in 100% mouse serum for 0 h or for 24 h at 37° C. 100 µl Affilin-serum solution was used to analyze the serum stability on HEK293-FOLR1-cells by FACS as described above (example 6). FACS analysis confirmed the binding of Affilin proteins to FOLR1 even after 24 h incubation in mouse serum (see Table 5). Further FOLR1 proteins were tested (results not shown) and binding to FOLR1 was confirmed even in the presence of serum.

Example 10. Serum Stability of FOLR1 Binding Proteins (ELISA)

High binding plates (Greiner, 781061) were immobilized with 0.1-2.5 µg/ml FOLR1-Fc over night at 4° C. Dilution series of 197556a (SEQ ID NO: 1 with C-terminal sequence SAWSHPQFEK), 202521 (SEQ ID NO: 30 with C-terminal coupling sequence "SAC"; see SEQ ID NO: 44) and 202521-Dota-Lu (SEQ ID NO: 30 with C-terminal coupling sequence "SAC" and Dota labeled with Lutetium $Lu^{3+}$) were incubated in 100% mouse serum overnight at 37° C. ELISA-plates were washed with 1×PBS and blocked with 3% BSA/0.5% Tween/PBS 2 h at RT. Dilution series after 0 h or 24 h incubation in the presence of serum were incubated on ELISA-plates 1 h at rt. After washing with PBST, wells were incubated with biotinylated anti-ubiquitin-antibody (1:1000) 1 h at rt. The binding was visualized with Streptavidin-HRP (1:10.000). The FOLR1 binding proteins show no shift of $K_D$ after 24h serum incubation. Thus, ELISA analysis confirmed the unchanged high affinity binding of Affilin proteins to FOLR1 even after 24 h incubation in mouse serum (see Table 6).

TABLE 5

Binding of FOLR1 binding proteins in the presence of serum (Flow cytometry)

| Affilin | EC50 (0 h) nM | EC50 (24 h) nM | Decrease (fold) | Serum stability |
|---|---|---|---|---|
| 199479 | 0.34 +/− 0.03 | 0.31 +/− 0.05 | 1 | Yes |
| 199487 | 0.33 +/− 0.02 | 0.62 +/− 0.05 | 1.9 | Yes |
| 197556a | 0.4 +/− 0.04 | 0.4 +/− 0.06 | 1.0 | Yes |
| 199489 | 0.49 +/− 0.05 | 0.7 +/− 0.16 | 1.4 | Yes |
| 199488 | 0.44 +/− 0.03 | 0.65 +/− 0.08 | 1.5 | Yes |
| 199488-Dota | 0.35 +/− 0.03 | 0.45 +/− 0.04 | 1.3 | Yes |
| 199490 | 0.43 +/− 0.06 | 0.47 +/− 0.07 | 1.1 | Yes |
| 199490-Dota | 0.3 +/− 0.02 | 0.37 +/− 0.03 | 1.2 | Yes |

TABLE 6

Binding of FOLR1 binding proteins in the presence of serum (ELISA)

| Affilin | Kd (0 h) nM | Kd (24 h) nM | Decrease (fold) | Serum stability |
|---|---|---|---|---|
| 197556a | 0.035 +/− 0.001 | 0.041 +/− 0.004 | 1.2 | Yes |
| 202521 | 0.074 +/− 0.003 | 0.11 +/− 0.003 | 1.5 | Yes |
| 202521-Dota-Lu | 0.050 +/− 0.002 | 0.046 +/− 0.003 | 0.9 | Yes |

The invention claimed is:

1. A folate receptor alpha (FOLR1) binding protein comprising an amino acid sequence at least 90% identical to an amino acid sequence selected from the group consisting of SEQ ID NOs: 2, 26, 28, and 29, wherein the FOLR1 binding protein has a specific binding affinity of less than 500 nM with respect to FOLR1 but not for folate receptor beta (FOLR2).

2. The FOLR1 binding protein according to claim 1, comprising an amino acid sequence selected from the group consisting of SEQ ID NOs: 1-45 and 69-73.

3. The FOLR1 binding protein according to claim 1, wherein:
   (i) the amino acid sequence is at least 90% identical to SEQ ID NO: 2, and amino acid residues corresponding to positions 9-12 of SEQ ID NO: 2 are EEKY (SEQ ID NO: 61), EERY (SEQ ID NO: 62), or EQKY (SEQ ID NO: 63); amino acid residues corresponding to positions 42-46 of SEQ ID NO: 2 are ELLWY (SEQ ID NO: 54), KLLWY (SEQ ID NO: 55), or KLLRY (SEQ ID NO: 56); and amino acid residues corresponding to positions 62-70 are LGGAVLKLQ (SEQ ID NO: 47), LGDAVLKLQ (SEQ ID NO: 48), or LGGAVLKLP (SEQ ID NO: 49); or
   (ii) the amino acid sequence is at least 90% identical to SEQ ID NO: 26, and amino acid residues corresponding to positions 9-12 of SEQ ID NO: 26 are LYKE (SEQ ID NO: 64), amino acid residues corresponding to positions 42-46 of SEQ ID NO: 26 are YLYWD (SEQ ID NO: 57) or YLYGD (SEQ ID NO: 58), and amino acid residues corresponding to positions 62-70 of SEQ ID NO: 26 are RFGDHLDLT (SEQ ID NO: 50) or RFGYHLDLT (SEQ ID NO: 51); or
   (iii) the amino acid sequence is at least 90% identical to SEQ ID NO: 28, and amino acid residues corresponding to positions 9-12 of SEQ ID NO: 28 are SYKW (SEQ ID NO: 65), amino acid residues corresponding to positions 42-46 of SEQ ID NO: 28 are QLVWD (SEQ ID NO: 59), and amino acid residues corresponding to positions 62-70 of SEQ ID NO: 28 are DLGGYLPLW (SEQ ID NO: 52); or
   (iv) the amino acid sequence is at least 90% identical to SEQ ID NO: 29, amino acid residues corresponding to positions 9-12 of SEQ ID NO: 29 are NIKD (SEQ ID NO: 66), amino acid residues corresponding to positions 42-46 SEQ ID NO: 29 are MLFWS (SEQ ID NO: 60), and amino acid residues corresponding to positions 62-70 SEQ ID NO: 29 are IAYMTLTLH (SEQ ID NO: 53).

4. The FOLR1 binding protein according to claim 1, wherein the FOLR1 binding protein is a multimer comprising a plurality of FOLR1 binding proteins.

5. The FOLR1 binding protein according to claim 1, further comprising one or more coupling domain(s) of 1 to 80 amino acids comprising one or more coupling site(s) for the coupling of chemical moieties.

6. The FOLR1 binding protein according to claim 1, further comprising at least one diagnostically active moiety.

7. The FOLR1 binding protein according to claim 1, further comprising at least one therapeutically active moiety.

8. The FOLR1 binding protein according to claim 1, further comprising at least one moiety modulating pharmacokinetics.

9. The FOLR1 binding protein according to claim 1, wherein the FOLR1 binding protein is a dimer of-the FOLR1 binding proteins.

10. The FOLR1 binding protein according to claim 1, wherein the FOLR1 binding protein is a homo-dimer of FOLR1 ; binding proteins.

11. The FOLR1 binding protein according to claim 1, further comprising one or more coupling domain(s) of 1 to 80 amino acids comprising one or more coupling sites for coupling of a chemical moiety, wherein the chemical moiety is selected from the group consisting of a chelator, a drug, a toxin, and a dye.

12. The FOLR1 binding protein according to claim 1, further comprising at least one diagnostically active moiety selected from the group consisting of a radionuclide, a fluorescent protein, a photosensitizer, a dye, and an enzyme, or any combination thereof.

13. The FOLR1 binding protein according to claim 1, further comprising at least one therapeutically active moiety selected from the group consisting of a monoclonal antibody or a fragment thereof, a radionuclide, a cytotoxic compound, a cytokine, a chemokine, and an enzyme, or any combination thereof.

14. The FOLR1 binding protein according to claim 1, further comprising at least one moiety that modulates pharmacokinetics selected from the group consisting of a polyethylene glycol, a human serum albumin, an albumin-binding peptide, an immunoglobulin binding peptide, an immunoglobulin or immunoglobulin fragment, a polysaccharide, and an amino acid sequence comprising amino acids alanine, glycine, serine, and proline.

\* \* \* \* \*